US012572352B2

(12) United States Patent
Sato et al.

(10) Patent No.: US 12,572,352 B2
(45) Date of Patent: Mar. 10, 2026

(54) PROGRAM, INFORMATION PROCESSING APPARATUS, AND METHOD

(71) Applicant: Findy Inc., Tokyo (JP)

(72) Inventors: Masataka Sato, Tokyo (JP); Hiroyuki Ishikawa, Tokyo (JP); Takashi Udagawa, Tokyo (JP); Chihaya Toda, Tokyo (JP); Satoko Takada, Tokyo (JP); Ryu Furuta, Tokyo (JP)

(73) Assignee: FINDY INC., Toyko (JP)

( * ) Notice: Subject to any disclaimer, the term of this patent is extended or adjusted under 35 U.S.C. 154(b) by 307 days.

(21) Appl. No.: 18/209,501

(22) Filed: Jun. 14, 2023

(65) Prior Publication Data

US 2023/0325180 A1 Oct. 12, 2023

Related U.S. Application Data

(63) Continuation of application No. PCT/JP2021/047578, filed on Dec. 22, 2021.

(30) Foreign Application Priority Data

Dec. 30, 2020 (JP) ................................. 2020-219905

(51) Int. Cl.
| | |
|---|---|
| *G06F 8/71* | (2018.01) |
| *G06F 8/73* | (2018.01) |
| *G06Q 10/0639* | (2023.01) |
| *H04L 67/55* | (2022.01) |

(52) U.S. Cl.
CPC .................. *G06F 8/71* (2013.01); *G06F 8/73* (2013.01); *G06Q 10/06398* (2013.01); *H04L 67/55* (2022.05)

(58) Field of Classification Search
None
See application file for complete search history.

(56) References Cited

U.S. PATENT DOCUMENTS

| | | | | | |
|---|---|---|---|---|---|
| 10,719,315 | B2 * | 7/2020 | Wright | ...................... | G06F 8/77 |
| 2011/0125798 | A1 * | 5/2011 | Misch | ........................ | G06F 8/71 |
| | | | | | 717/110 |
| 2018/0068271 | A1 * | 3/2018 | Abebe | .................. | G06Q 10/103 |
| 2018/0357588 | A1 * | 12/2018 | J D | ............................ | G06F 8/71 |
| 2019/0066023 | A1 * | 2/2019 | Von Jan | ................ | G06F 16/337 |

(Continued)

FOREIGN PATENT DOCUMENTS

| | | |
|---|---|---|
| JP | 2004-054393 A | 2/2004 |
| JP | 2008-027017 A | 2/2008 |

(Continued)

OTHER PUBLICATIONS

International Search Report and Written Opinion mailed on Mar. 8, 2022, received for PCT Application PCT/JP2021/047578, filed on Dec. 22, 2021, 9 pages including English Translation.

*Primary Examiner* — Ryan D. Coyer
(74) *Attorney, Agent, or Firm* — XSENSUS LLP

(57) ABSTRACT

A server in a team activity evaluation system includes, as its functions, a scoring module for specifying a team score (parameter) indicating an activity situation of an engineer team, based on various parameters indicating the activity situation of the engineer team, and a presentation module for presenting, to a user, the team score indicating the activity situation of the engineer team that has been specified, in association with time-series information.

18 Claims, 22 Drawing Sheets

(56) References Cited

U.S. PATENT DOCUMENTS

| 2020/0097870 | A1* | 3/2020 | Mcginty | ........ | G06Q 10/063118 |
| 2021/0365856 | A1* | 11/2021 | Mukherjee | .......... | G06Q 10/103 |
| 2022/0036279 | A1* | 2/2022 | Circei | ............... | G06Q 10/1091 |
| 2022/0050677 | A1* | 2/2022 | Kesiboyana | .......... | G06N 20/00 |

FOREIGN PATENT DOCUMENTS

| JP | 2013-182533 | A | 9/2013 |
| JP | 2015-118650 | A | 6/2015 |

* cited by examiner

| STORAGE UNIT | | | | | | | | |
|---|---|---|---|---|---|---|---|---|
| REPOSITORY DATABASE | | | | | | | | 2021 |
| ORGANIZATION ID | REPOSITORY ID | ADDRESS | UPDATE HISTORY INFORMATION | | | | | |
| | | | ACTION | WORKER | TITLE | SOURCE CODE | CREATED DATE AND TIME INFORMATION | UPDATED DATE AND TIME INFORMATION |
| #0101 | #0201 | https://xxx.com/Repo1 | PUSH | #0303 | CORRECTION OF ○× | abcd.md | 2020/11/24 13:11:25 | 2020/11/24 14:21:43 |
| | | | PULL REQUEST | #0303 | CORRECTION OF ○× | abcd.md | 2020/11/24 17:34:07 | 2020/11/24 18:11:03 |
| | | | COMMENT | #0306 | CORRECTION OF ○× | abcd.md | 2020/11/25 10:26:45 | 2020/11/25 10:29:54 |
| | | | ... | ... | ... | ... | ... | ... |
| #0102 | #0202 | https://xxx.com/Repo2 | COMMENT | #0302 | REVISION OF ▽□ | efgh.md | 2020/11/25 18:31:09 | 2020/11/25 18:44:55 |
| | | | COMMIT | #0303 | REVISION OF ▽□ | efgh.md | 2020/11/26 09:52:36 | 2020/11/26 09:54:34 |
| | | | MERGE | #0303 | REVISION OF ▽□ | efgh.md | 2020/11/26 11:46:28 | 2020/11/26 11:48:27 |
| | | | ... | ... | ... | ... | ... | ... |
| #0102 | #0203 | https://xxx.com/Repo3 | COMMENT | #0301 | CREATION OF △○ | hijk.md | 2020/11/26 19:22:49 | 2020/11/26 19:21:44 |
| | | | COMMENT | #0304 | CREATION OF △○ | hijk.md | 2020/11/26 20:01:33 | 2020/11/26 20:02:44 |
| | | | MERGE | #0302 | CREATION OF △○ | hijk.md | 2020/11/26 22:37:18 | 2020/11/26 22:39:01 |
| | | | ... | ... | ... | ... | ... | ... |
| ... | ... | ... | ... | ... | ... | ... | ... | ... |

STORAGE UNIT

2022

PERSONAL PERFORMANCE DATABASE

| MEMBER ID | PERFORMANCE DETAILS | | | |
|---|---|---|---|---|
| | REPOSITORY ID | ACTION | PARTNER MEMBER ID | DATE INFORMATION |
| #0301 | #0203 | PUSH | - | 2020/11/24 |
| | #0203 | PULL REQUEST | - | 2020/11/24 |
| | ... | ... | ... | ... |
| #0302 | #0202 | COMMENT | #0203 | 2020/11/26 |
| | #0202 | COMMENT | #0204 | 2020/11/26 |
| | ... | ... | ... | ... |
| #0303 | #0202 | COMMIT | #0202 | 2020/11/25 |
| | #0201 | MERGE | - | 2020/11/25 |
| | ... | ... | ... | ... |
| ... | ... | ... | | ... |

2023

TEAM SCORE DATABASE

| ORGANIZATION ID | REPOSITORY ID | TEAM MEMBER | TEAM DETAIL INFORMATION | | | | |
|---|---|---|---|---|---|---|---|
| | | | DATE | THE NUMBER OF PULL REQUESTS | THE NUMBER OF MERGES | THE NUMBER OF COMMITS | THE NUMBER OF REVIEWS |
| #0101 | #0201 | #0203 #0206 | 2020/11/24 | 5 | 4 | 2 | 3 |
| | | | 2020/11/25 | 3 | 2 | 3 | 2 |
| | | | 2020/11/26 | 2 | 5 | 4 | 0 |
| | | | ... | ... | ... | ... | ... |
| #0102 | #0202 | #0202 #0203 | 2020/11/30 | 1 | 2 | 2 | 0 |
| | | | 2020/12/1 | 2 | 1 | 3 | 2 |
| | | | 2020/12/2 | 2 | 2 | 1 | 2 |
| | | | ... | ... | ... | ... | ... |
| #0103 | #0203 | #0201 #0202 #0204 | 2020/12/2 | 6 | 3 | 2 | 4 |
| | | | 2020/12/3 | 4 | 3 | 3 | 4 |
| | | | 2020/12/6 | 3 | 3 | 1 | 2 |
| | | | ... | ... | ... | ... | ... |
| ... | ... | ... | ... | ... | ... | ... | ... |

SERVER 20

S111

USER TAKES ACTION
(PUSH, COMMENT) ON
REMOTE REPOSITORY

S112

ACQUIRE VARIOUS
PARAMETERS
IN REPOSITORY

S113

PERFORM
ARITHMETIC OPERATION OF
PERFORMANCE OF MEMBER

S114

SPECIFY ACTIVITY
SITUATION OF TEAM

S115

DETERMINE ALERT
FROM ACTIVITY
SITUATION OF TEAM

S116

UPDATE EACH DATABASE (a)

INFORMATION 1039a     1039b     1039c     1039d

Figure 16:
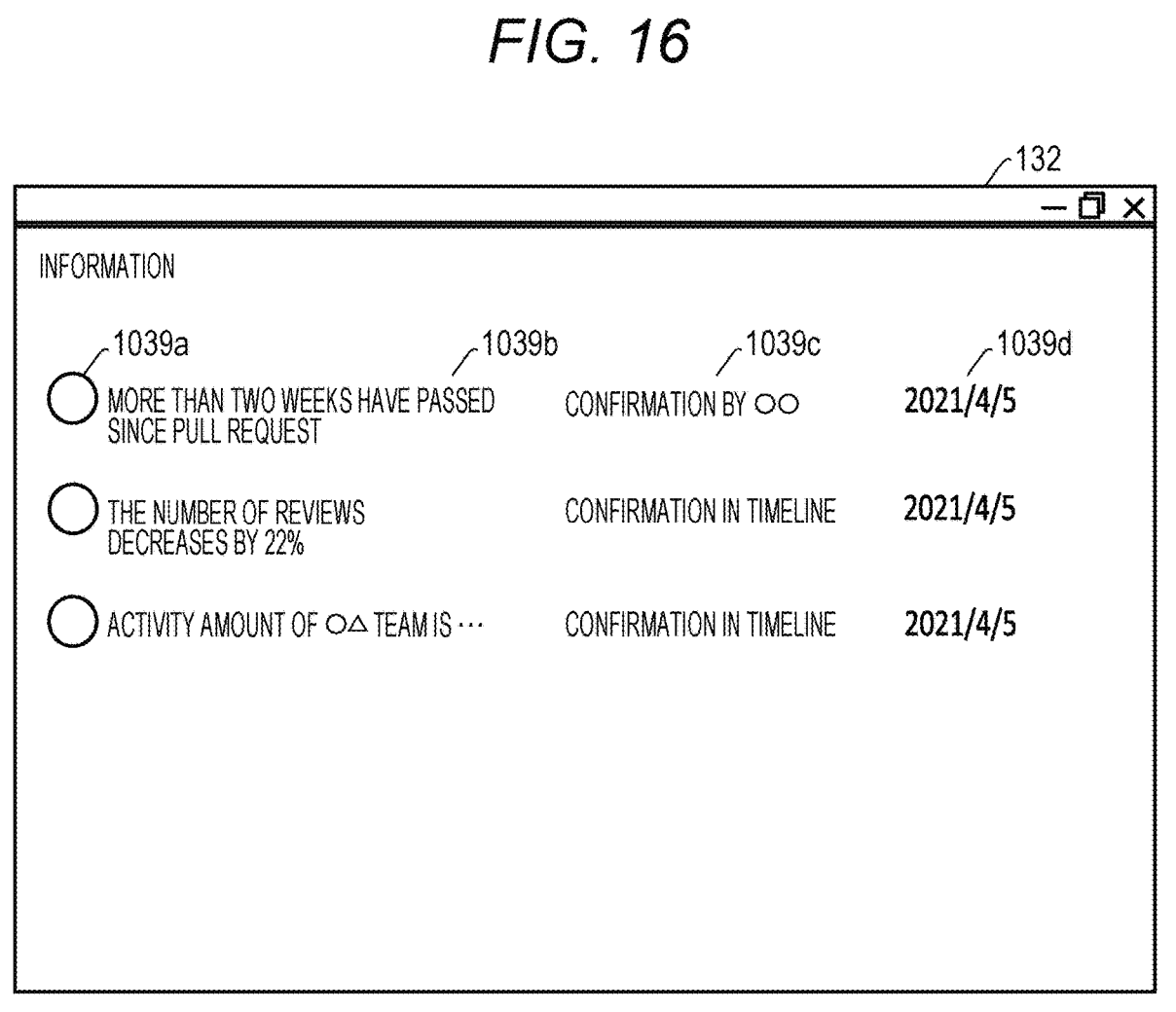

○ MORE THAN TWO WEEKS HAVE PASSED SINCE PULL REQUEST     CONFIRMATION BY ○○     2021/4/5

○ THE NUMBER OF REVIEWS DECREASES BY 22%     CONFIRMATION IN TIMELINE     2021/4/5

○ ACTIVITY AMOUNT OF ○△ TEAM IS ···     CONFIRMATION IN TIMELINE     2021/4/5

Figure 18:
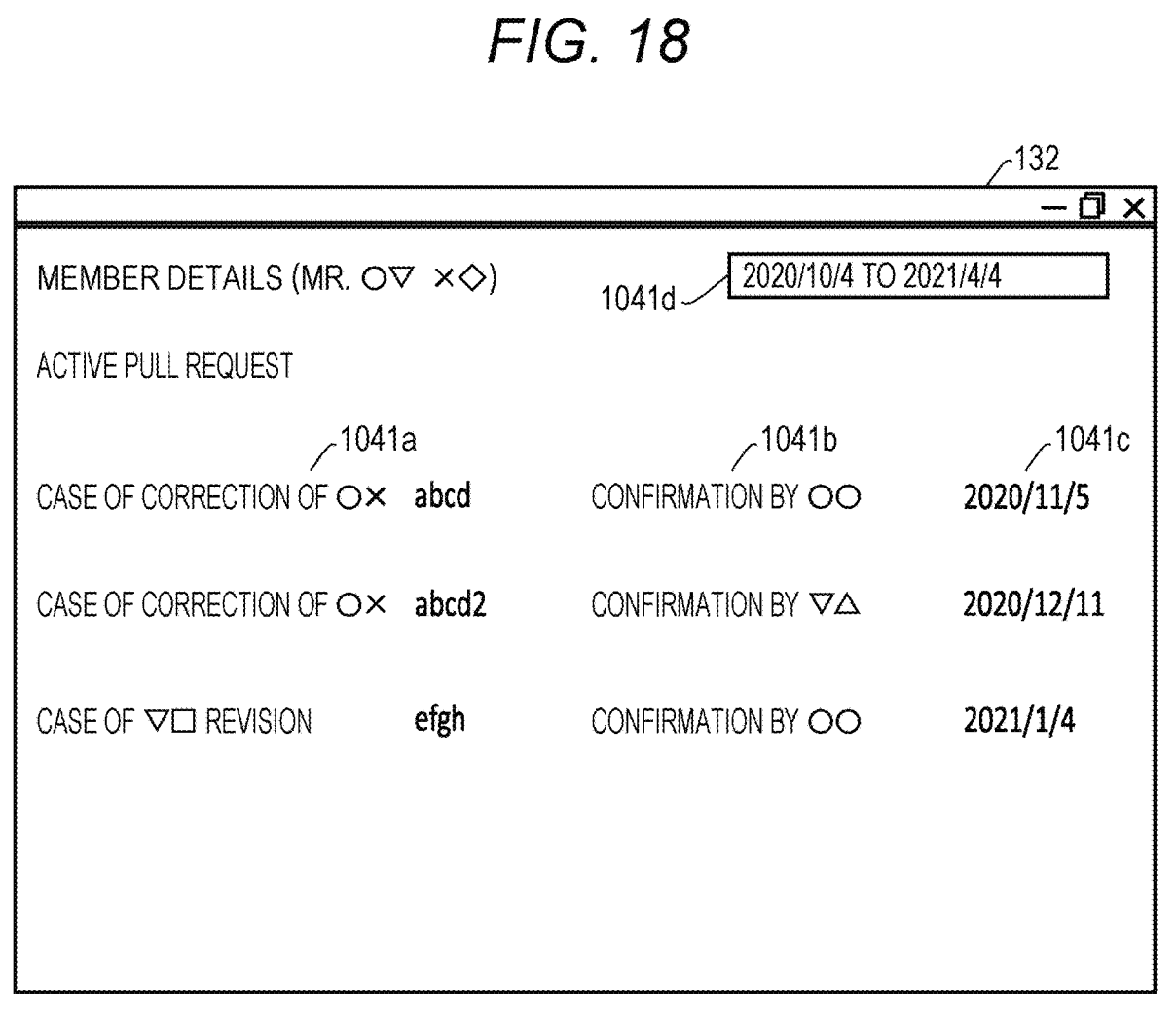

MEMBER DETAILS (MR. ○▽ ×◇)    1041d    2020/10/4 TO 2021/4/4

ACTIVE PULL REQUEST 1041a                           1041b                    1041c

CASE OF CORRECTION OF ○×  abcd      CONFIRMATION BY ○○      2020/11/5

CASE OF CORRECTION OF ○×  abcd2     CONFIRMATION BY ▽△      2020/12/11

CASE OF ▽□ REVISION       efgh      CONFIRMATION BY ○○      2021/1/4

*FIG. 21*

| ENGINEER ID | SELF-REPORTED SKILL | SCORE INFORMATION | | PERFORMANCE DETAILS | | | |
|---|---|---|---|---|---|---|---|
| | | DEVELOPMENT LANGUAGE | SCORE | TEAM ID | ACTION | PARTNER MEMBER ID | VALUE |
| #0301 | AWS, Docker, Elasticsearch | Ruby | 51 | #0103 | PUSH | - | (THE NUMBER OF CODES) 1,320 |
| | | PHP | 55 | #0103 | PULL REQUEST | - | (THE NUMBER OF FILES) 2 |
| | | JavaScript | 52 | ... | ... | ... | ... |
| #0302 | Redux, Webpack | TypeScript | 60 | #0102 | COMMENT | #0403 | (THE NUMBER OF FILES) 2 |
| | | Go | 63 | #0102 | COMMENT | #0404 | (THE NUMBER OF FILES) 4 |
| | | C# | 59 | ... | ... | ... | ... |
| #0303 | Terraform, RxSwift, Flutter | Java | 66 | #0105 | PUSH | - | - |
| | | Kotlin | 70 | #0105 | PULL REQUEST | - | - |
| | | Swift | 82 | ... | ... | ... | ... |
| ... | ... | | | ... | ... | | ... |

STORAGE UNIT — 202
ENGINEER DATABASE — 2024

PROGRAM, INFORMATION PROCESSING APPARATUS, AND METHOD

CROSS-REFERENCE TO RELATED APPLICATIONS

The present application is a bypass-continuation of PCT filing PCT/JP2021/047578, filed Dec. 22, 2021, which claims priority to JP 2020-219905, filed Dec. 30, 2020, the entire contents of each are incorporated herein by reference.

FIELD

Background

The present disclosure relates to a program, an information processing apparatus, and a method.

Description of the Related Art

Product development in business activities is conducted by a team including a plurality of engineers, in many cases. In the product development by the team, it is necessary to appropriately allocate personnel in the team and appropriately review products, and it is necessary to maximize the performance as the team.

Patent Literature 1 discloses an activity analysis technique for analyzing organization and independency properties of activities in business activities. Such a technique is a method for analyzing an organization by acquiring information about a plurality of persons who can be simultaneously involved in an activity, for example, a conference or the like, in a location of such an activity in which participants are simultaneously involved is generated, from position information of the participants.

CITATION LIST

Patent Literature

Patent Literature 1: JP 2008-027017 A

SUMMARY

Technical Problems

In evaluating the performance of an engineer team including engineers who conduct product development and the like, it is necessary to appropriately grasp products of the team. For this purpose, it is necessary to grasp not only the quantity of the products by the respective engineers who are members in the engineer team but also what type of processes have been through in the team. A method for appropriately grasping performance as an engineer team as described above has been demanded.

Therefore, in the present disclosure, a technique for appropriately evaluating the performance as an engineer team will be described.

Solutions to the Problems

According to an embodiment of the present disclosure, a program to be executed by a computer including a processor and a storage unit is provided. The program causes the processor to execute: a step of specifying a parameter indicating an activity situation of an engineer team, based on histories of information that a member who belongs to the engineer team has uploaded online to create a product, as an engineer, and information of a review that the member of the engineer team has conducted on the product that has been uploaded; and a step of presenting the parameter to a user.

Advantageous

According to the present disclosure, the parameter indicating the activity situation of the engineer team is specified based on the histories of the information that has been uploaded by the engineer to create the product, and the information of the review that the member of the engineer team has conducted on the product that has been uploaded. Therefore, it becomes possible to appropriately grasp the performance as the engineer team.

BRIEF DESCRIPTION OF DRAWINGS

FIG. 4 is a diagram illustrating a data structure of a repository database, which is stored in the server.

FIG. 5 is a diagram illustrating data structures of a personal performance database and a team score database, which are stored in the server.

FIG. 16 is a diagram illustrating a display screen example of alert information to be displayed on the terminal device.

FIG. 18 is a diagram illustrating a display screen example of the pull request situation of a member to be displayed on the terminal device.

FIG. 21 is a diagram illustrating a data structure of an engineer database, which is stored in the server.

DETAILED DESCRIPTION

Figure 1:
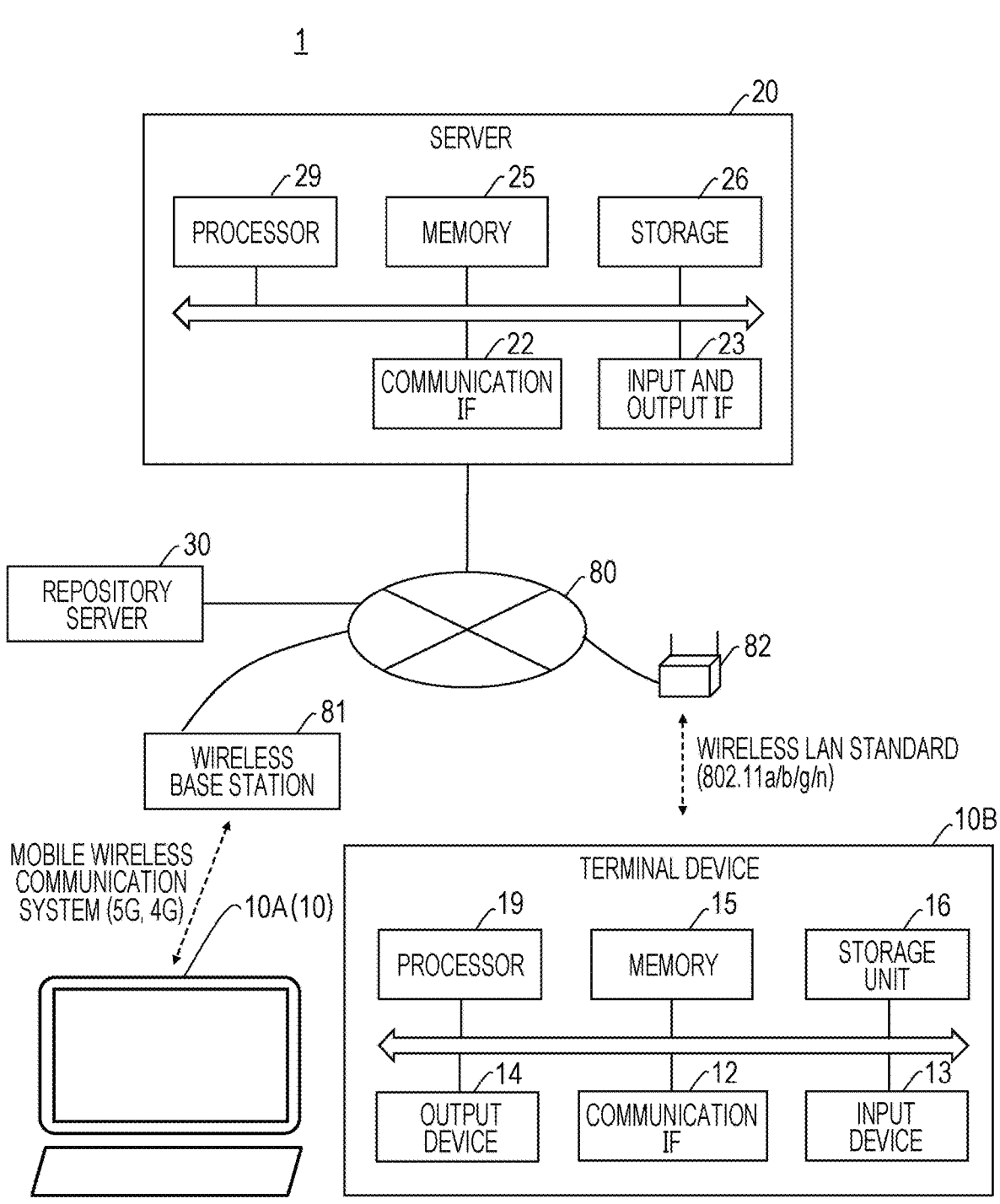
FIG. 1 is a diagram illustrating an overall configuration of a team activity evaluation system.

Hereinafter, embodiments of the present disclosure will be described with reference to the drawings. In the following description, the same components are denoted by the same reference numerals. This applies to their names and functions. Therefore, their detailed descriptions will not be repeated.

Overview

Hereinafter, a team activity evaluation system according to the present disclosure will be described. Such a team activity evaluation system is a system for specifying and evaluating a team score (parameter) indicating an activity situation (performance) of an engineer team including engineers who conduct product development and the like. Here, the engineer team includes a plurality of engineers, and is a team for proceeding with development of a specific product, for example, a web service, a website, or the like provided by so-called software as a service (SaaS). The respective engineers in the team are assigned for roles in every function, every output, and the like of the service, and advance the development. In addition, the engineers in the team are not limited to company employees who are employed by a specific company. In a development project in which a plurality of companies jointly proceed with the development, the engineers may be employees of the respective companies, or may include a self-employed worker that is a so-called freelance engineer.

In order to specify a team score indicating an activity situation of an engineer team, the team activity evaluation system according to the present disclosure accesses, as an example, GitHub (registered trademark) that is a software development platform, and acquires various parameters each indicating an achievement as an engineer who is a member of the engineer team. GitHub denotes a source code hosting service, has a repository (management means) for version management of source codes which are the products, and manages a list of source codes at a certain point of time. In addition, GitHub has functions of an issue (creation) for managing a project or a source code issue, a push for uploading a source code that has been created or corrected in a local environment (local repository) of an engineer to a remote environment (remote repository), a pull request for giving a notification that the push has been made and requesting a review, a commit for adopting a comment or a corrected content at the time of the review, a merge for confirming a review result and integrating histories, and the like. Note that here, the source code denotes a concept including a programming language such as Python and a script language that is one type of a programming language such as JavaScript (registered trademark). That is, the team activity evaluation system according to the present disclosure acquires parameters related to a product managed by an external server (cloud server), and is a system that indicates an activity situation of an engineer team without the need for monitoring a use situation of a personal PC.

In addition, the programming language denotes a language for use in software development, and specifically includes HTML, CSS, JavaScript (registered trademark), Java (registered trademark), Scala, PHP, Ruby, Python, Go, C#, Node.js, and the like. In addition, the software framework denotes a software platform for use in the software development, and specific examples include jQuery, React, Vue.js, Angular, Nuxt.js, Next.js, ReactNative, Spring Framework, Play Framework, Laravel, CakePHP, Rubyon-Rails, Django, Flask, TensorFlow, gin, Unity, and Express.

As the various parameters indicating the activity situation of the engineer team, by acquiring values such as the number of pushes (the number of uploads) to GitHub, the number of created codes in a source code, the number of corrected codes on GitHub, the number of pull requests (the number of review requests), and the number of merges (the number of integrations) that are managed on GitHub, the products in the engineer team are respectively converted into numerical values as information that has been uploaded online, and a score is calculated. Accordingly, it is considered that it is possible to estimate the activity situation of the engineer team from a quantitative aspect of the product. For example, in a case where there are a large number of the created codes in the source code, a large number of the corrected codes, and a large number of pushes, it can be said that the engineer team has created lots of products. Thus, it is estimated that the engineer team is active in the activity situation in creating the products. Therefore, by use of the degree of the score, it is considered that it is possible to estimate the activity situation of the engineer team with regard to the products from a quantitative aspect of the product.

In addition, by acquiring the values of the number of the created issues, the number of reviews, the number of comments, the number of comment replies, the number of commits, and the like on GitHub to be managed on GitHub are, as the various parameters indicating the activity situation of the engineer team, these values are included to be converted into numerical values as review information that the members of the engineer team have conducted, and a score is calculated. Accordingly, it is considered that it is possible to estimate the activity situation of the engineer team from a qualitative aspect of the product. For example, in a case where there are a large number of reviews and a large number of comments, it can be said that there are lots of checks and discussions with regard to the products in the engineer team. Thus, it is estimated that the reviews by the engineer team with regard to the products are active, and the quality of the products tends to be highly ensured. Therefore, by use of the degree of the score, it is considered that it is possible to estimate the activity situation of the engineer team with regard to the products from a qualitative aspect of the product.

Furthermore, by presenting these team scores in association with time-series information, it is considered that it is possible to grasp the activity situation of the engineer team in a time-series manner. For example, in a case where the team score for a specific period of time (for example, one week) is lower than that for another period of time, it is estimated that either the creation of the product or the review of the product or both of them for such a period of time have been sluggish. Therefore, it contributes to grasping the situation of the team at an early stage and specifying its cause.

Hence, in the team activity evaluation system according to the present disclosure, the values of various parameters on GitHub are acquired, and a team score indicating an activity situation of an engineer team is specified from these values. This team score is presented to a member of the engineer team, a manager who manages the engineer team, and the like (the manager of the team, a responsible person in human resources department, a company management member, and the like). With such a configuration, it becomes possible to present the activity situation of the engineer team in a more objective manner so as to be grasped. Note that a product in the engineer team denotes a concept including setting information on a system, a database, various specifications, and the like in addition to source codes on GitHub. However, in the present embodiment, source codes on GitHub will be described as an example.

First Embodiment

Hereinafter, a team activity evaluation system 1 will be described. In the following description, for example, when a terminal device 10 accesses a server 20, the server 20 makes a response with information for generating a screen on the terminal device 10. The terminal device 10 generates and displays the screen based on the information that has been received from the server 20.

<1 Overall Configuration of Team Activity Evaluation System 1>

FIG. 1 is a diagram illustrating an overall configuration of the team activity evaluation system 1. As illustrated in FIG. 1, the team activity evaluation system 1 includes a plurality of terminal devices (a terminal device 10A and a terminal device 10B are illustrated in FIG. 1. Hereinafter, they will be collectively referred to as a "terminal device 10", in some cases), the server 20, and a repository server 30. The terminal device 10, the server 20, and the repository server 30 are communicably connected with one another through a network 80. The network 80 is configured with a wired or wireless network.

The terminal device 10 is a device to be operated by each user. Here, a user denotes a person who uses the terminal device 10 and receives a presentation of an activity situation of an engineer team by the team activity evaluation system 1, but is not limited to a member of the engineer team. The user denotes a person such as a manager (who does not belong to the team) of a belonging company, a responsible person in a human resources department, a company management member, or the like. The terminal device 10 is implemented by a stationary personal computer (PC), a laptop PC, or the like. In addition to this, the terminal device 10 may be, for example, a portable terminal such as a tablet or a smartphone adaptive to a mobile communication system.

The terminal device 10 is communicably connected with the server 20 and the repository server 30 through the network 80. The terminal device 10 is connected with the network 80 by communicating with a communication device such as a wireless base station 81, which is compliant with a communication standard such as 4G, 5G, or long term evolution (LTE), or a wireless local area network (LAN) router 82, which is compliant with a wireless LAN standard such as Institute of Electrical and Electronics Engineers (IEEE) 802.11. As illustrated as the terminal device 10B in FIG. 1, the terminal device 10 includes a communication interface (IF) 12, an input device 13, an output device 14, a memory 15, a storage unit 16, and a processor 19.

The communication IF 12 is an interface for inputting and outputting signals so that the terminal device 10 communicates with an external device. The input device 13 is an input device (for example, a keyboard, a touch panel, a touch pad, a pointing device such as a mouse, or the like) for receiving an input operation from a user. The output device 14 is an output device (display, speaker, or the like) for presenting information to the user. The memory 15 is for temporarily storing programs, data processed by the programs, and the like, and is, for example, a volatile memory such as a dynamic random access memory (DRAM). The storage unit 16 is a storage device for storing data, and is, for example, a flash memory or a hard disc drive (HDD). The processor 19 is hardware for executing an instruction set written in a program, and includes an arithmetic operation device, a register, a peripheral circuit, and the like.

The server 20 is a device that manages information of various parameters on GitHub, performance of members who belong to an engineer team, and a team score indicating an activity situation of the engineer team. The server 20 receives information for identifying an engineer team from a user, specifies a team score indicating an activity situation of an engineer team to be a target, and presents the team score to the user.

The server 20 is a computer connected with the network 80. The server 20 includes a communication IF 22, an input and output IF 23, a memory 25, a storage 26, and a processor 29.

The communication IF 22 is an interface for inputting and outputting signals so that the server 20 communicates with an external device. The input and output IF 23 functions as an interface with an input device for receiving an input operation from the user and an output device for presenting information to the user. The memory 25 is for temporarily storing programs, data processed by the programs, and the like, and is, for example, a volatile memory such as a dynamic random access memory (DRAM). The storage 26 is a storage device for storing data, and is, for example, a flash memory or a hard disc drive (HDD). The processor 29 is hardware for executing an instruction set written in a program, and includes an arithmetic operation device, a register, a peripheral circuit, and the like.

The repository server 30 is a device that manages a remote repository (management means) on GitHub. The repository server 30 receives the source code that has been pushed by the user, stores and manages the source code, and receives a pull request, a comment, a commit, a merge, and the like.

<1.1 Configuration of Terminal Device 10>

Figure 2:
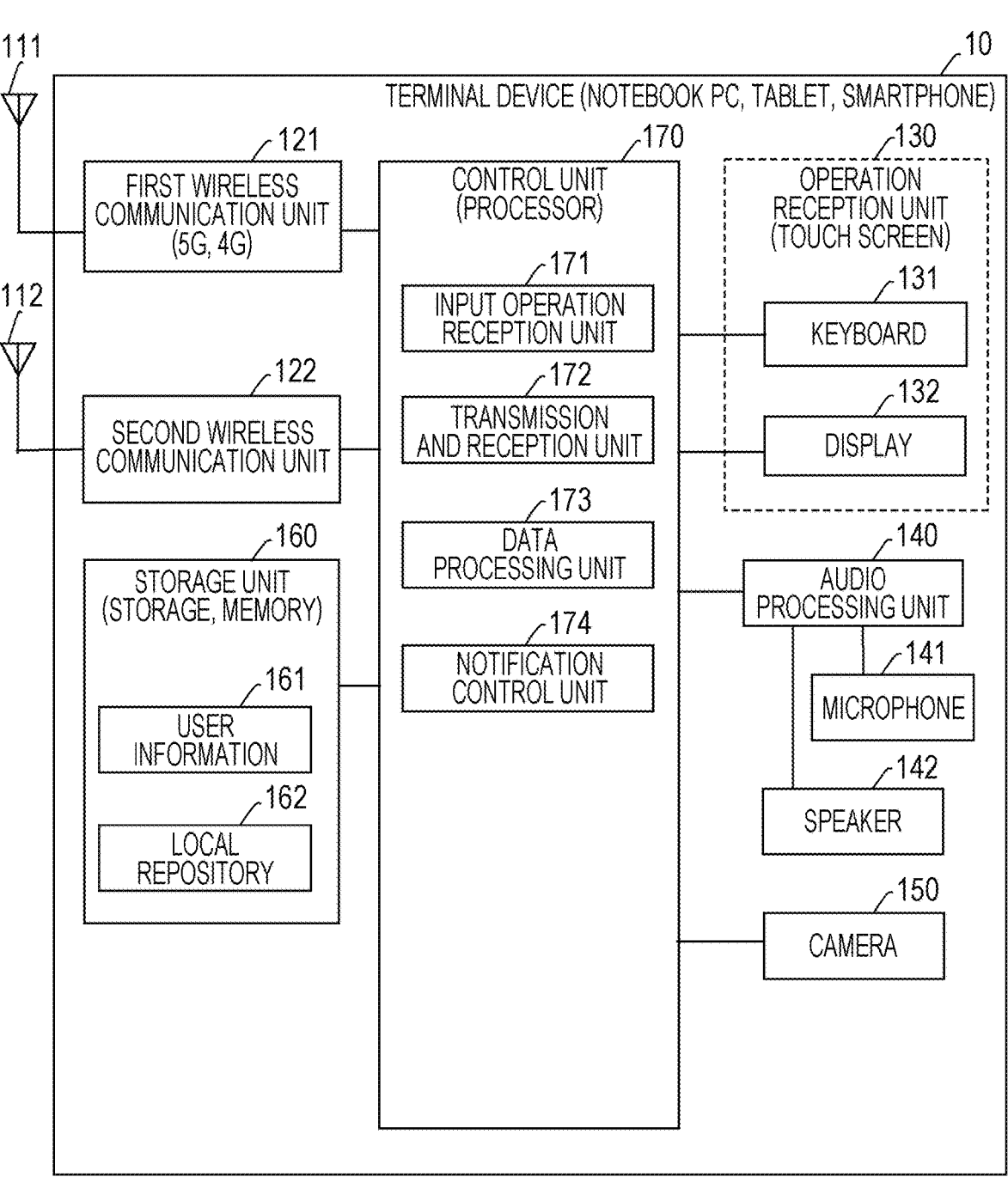
FIG. 2 is a block diagram illustrating a functional configuration of a terminal device, which constitutes the team activity evaluation system in a first embodiment.

FIG. 2 is a block diagram illustrating a functional configuration of the terminal device 10, which constitutes the team activity evaluation system 1 in the first embodiment. As illustrated in FIG. 2, the terminal device 10 includes a plurality of antennas (an antenna 111 and an antenna 112), wireless communication units (a first wireless communication unit 121 and a second wireless communication unit 122) corresponding to the respective antennas, an operation reception unit 130 (including a keyboard 131 and a display 132), an audio processing unit 140, a microphone 141, a speaker 142, a camera 150, a storage unit 160, and a control unit 170. The terminal device 10 also has functions and configurations (for example, a battery for holding electric power, a power supply circuit for controlling the supply of the electric power from the battery to each circuit, and the like) that are not particularly illustrated in FIG. 2. As illustrated in FIG. 2, the respective blocks included in the terminal device 10 are electrically connected by a bus or the like.

The antenna 111 radiates signals emitted from the terminal device 10, as radio waves. In addition, the antenna 111 receives radio waves from space, and gives a reception signal to the first wireless communication unit 121.

The antenna 112 radiates signals emitted from the terminal device 10, as radio waves. In addition, the antenna 112 receives radio waves from space, and gives a reception signal to the second wireless communication unit 122.

The first wireless communication unit 121 performs modulation and demodulation processing and the like for transmitting and receiving signals via the antenna 111 so that the terminal device 10 communicates with another wireless device. The second wireless communication unit 122 performs modulation and demodulation processing and the like for transmitting and receiving signals via the antenna 112 so that the terminal device 10 communicates with another wireless device. The first wireless communication unit 121 and the second wireless communication unit 122 are each a communication module including a tuner, a received signal strength indicator (RSSI) calculation circuit, a cyclic redundancy check (CRC) calculation circuit, a high frequency circuit, and the like. The first wireless communication unit 121 and the second wireless communication unit 122 each conducts modulation or demodulation and frequency conversion of wireless signals transmitted and received by the terminal device 10, and give a reception signal to the control unit 170.

The operation reception unit 130 has a mechanism for receiving a user's input operation. Specifically, the operation reception unit 130 includes a keyboard 131 and a display 132. Note that the operation reception unit 130 may be configured as a touch screen that detects a contact position of the user on the touch panel, by using, for example, an electrostatic capacitive touch panel.

The keyboard 131 receives an input operation of the user of the terminal device 10. The keyboard 131 is a device that conducts a character input, and outputs character information that has been input, to the control unit 170, as an input signal.

The display 132 displays data such as an image, a video, and a text in accordance with the control of the control unit 170. The display 132 is implemented by, for example, a liquid crystal display (LCD) or an organic electro-luminescence (EL) display.

The audio processing unit 140 modulates and demodulates an audio signal. The audio processing unit 140 modulates a signal given from the microphone 141, and gives a modulated signal to the control unit 170. In addition, the audio processing unit 140 gives the audio signal to the speaker 142. The audio processing unit 140 is implemented by, for example, a processor for audio processing. The microphone 141 receives an audio input, and gives an audio signal corresponding to the audio input to the audio processing unit 140. The speaker 142 converts the audio signal given from the audio processing unit 140 into a sound, and outputs the sound to the outside of the terminal device 10.

The camera 150 is a device for receiving light with a light receiving element and outputting the light as a captured image. The camera 150 is, for example, a depth camera capable of detecting a distance from the camera 150 to an imaging target.

The storage unit 160 includes, for example, a flash memory or the like, and stores data and programs to be used by the terminal device 10. In one aspect, the storage unit 160 stores user information 161 and a local repository 162.

The user information 161 is information of a user who uses the terminal device 10, and who receives a presentation of a team score indicating an activity situation of an engineer team that is a function of the team activity evaluation system 1. The user information includes information for identifying a user (user ID), a user's name or a call name, organization information of a company or the like to which the user belongs, ID information and a password to sign-in to GitHub, and the like.

The local repository 162 stores information such as a source code for the user to work in his/her local environment in doing software development on GitHub. The user stores the created source code in the local repository 162, and corrects the source code stored in the local repository 162. After completion of creation and correction, the user pushes the source code to the repository server 30.

The control unit 170 reads a program stored in the storage unit 160, and executes commands included in the program so as to control the operation of the terminal device 10. The control unit 170 is, for example, an application installed in the terminal device 10 beforehand. The control unit 170 operates in accordance with the program, and fulfills functions as an input operation reception unit 171, a transmission and reception unit 172, a data processing unit 173, and a notification control unit 174.

The input operation reception unit 171 performs processing of receiving a user's input operation on an input device such as the keyboard 131.

The transmission and reception unit 172 performs processing for the terminal device 10 to transmit or receive data to or from an external device such as the server 20 in compliance with communication protocols.

The data processing unit 173 performs an arithmetic operation in accordance with a program on the data, the input of which has been received by the terminal device 10, and performs processing of outputting an arithmetic operation result to a memory or the like.

The notification control unit 174 performs processing of presenting information to the user. The notification control unit 174 performs processing of causing a display image to be displayed on the display 132, processing of causing the speaker 142 to output the sound, processing of causing the camera 150 to generate vibration, and the like.

<1.2 Functional Configuration of Server 20>

Figure 3:
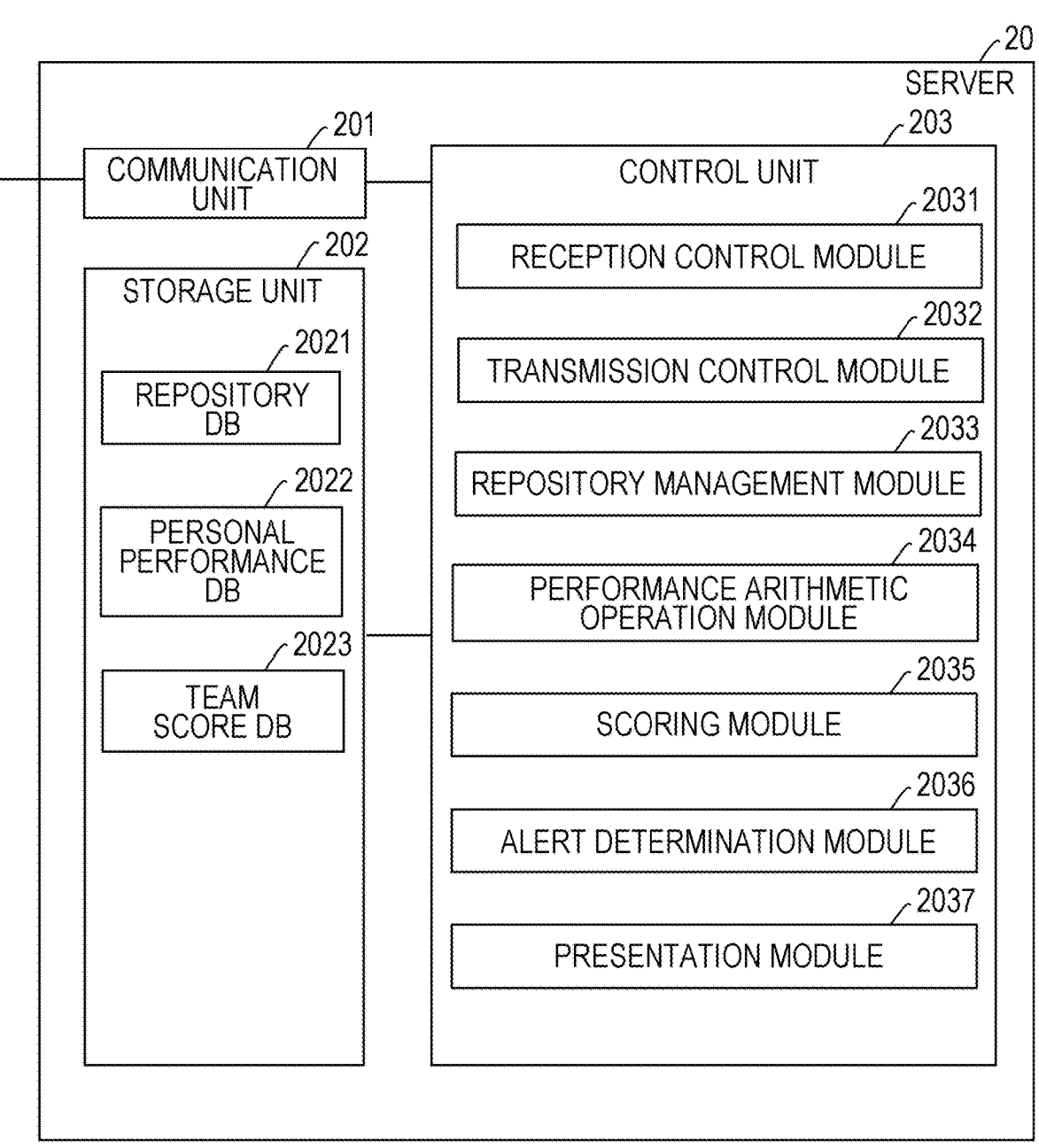
FIG. 3 is a diagram illustrating a functional configuration of a server, which constitutes the team activity evaluation system in the first embodiment.

FIG. 3 is a diagram illustrating a functional configuration of the server 20, which constitutes the team activity evaluation system 1 in the first embodiment. As illustrated in FIG. 3, the server 20 fulfills functions as a communication unit 201, a storage unit 202, and a control unit 203.

The communication unit 201 performs processing for the server 20 to communicate with an external device.

The storage unit 202 stores data and programs to be used by the server 20. The storage unit 202 stores a repository database 2021, a personal performance database 2022, a team score database 2023, and the like.

The repository database 2021 is a database for holding various types of information about various parameters, such as the number of the created codes in the source code and the number of pushes in the remote repository that have been acquired from the repository server 30, in the team activity evaluation system 1. Details will be described later.

The personal performance database 2022 is a database for holding information indicating performances of members of an engineer team, in the team activity evaluation system 1. Details will be described later.

The team score database 2023 is a database for holding a team score indicating an activity situation of an engineer team and information of various parameters that serve as bases of the team score to be presented in the team activity evaluation system 1. Details will be described later.

The processor of the server 20 performs processing in accordance with the program, so that the control unit 203 fulfills functions illustrated in a reception control module 2031, a transmission control module 2032, a repository management module 2033, a performance arithmetic operation module 2034, a scoring module 2035, an alert determination module 2036, and a presentation module 2037, as various modules.

The reception control module 2031 controls processing for the server 20 to receive signals from an external device in compliance with communication protocols.

The transmission control module 2032 controls processing for the server 20 to transmit signals to an external device in compliance with communication protocols.

The repository management module 2033 controls processing of acquiring information about each user recorded on a network. The user of the team activity evaluation system 1 is engaged in the source code development on GitHub. Hence, various parameters such as the number of the created codes in the source code on GitHub (source code hosting), the number of corrected codes, the number of pushes of the source code, and the number of pull requests are recorded in the repository server 30, as various parameters indicating the activity situation of the engineer team. In addition, various parameters such as the number of created issues, the number of reviews, the number of comments, the number of comment replies, and the number of commits are recorded in the repository server 30, as the various parameters. Therefore, the repository management module 2033 accesses the repository server 30, and acquires various parameters of the user.

In the repository server 30, in order to manage the version of the source code, when a certain user pushes the source code from the local repository, information of the user and the date and time at that time are recorded as log information. Similarly, for respective actions including a case where an issue is created for the source code or the like, a case where a pull request is made for the source code, a case where a comment is created, a case where a reply to the comment is made, and a case where a merge is done, information of the user who has taken the action and the date and time at that time are recorded as the log information. These pieces of information are recorded for every engineer team to which each user belongs, for every project, and for every file of the source code that has been created in such a project. The repository management module 2033 acquires these pieces of log information from the repository server 30.

The performance arithmetic operation module 2034 controls processing of calculating a value (personal score) indicating performance (achievement) of a member who belongs to an engineer team. For example, by counting the number of created codes in the source code, the number of corrected codes, the number of pushes of the source code, and the number of pull requests that have been conducted on GitHub by such a member for a certain period of time, it is possible to learn about the amount of the source code (the number of codes, the number of files, or the like) created by the user as an engineer for the certain period of time. Therefore, it is possible to estimate an achievement of such a member for the certain period of time as the engineer (programmer). In addition, by counting the number of created issues, the number of reviews, the number of comments, the number of comment replies, and the number of commits that have been conducted on GitHub by such a member for a certain period of time, it becomes possible to learn about the amount of reviews conducted by the user as an engineer for the certain period of time. Therefore, it is possible to estimate an achievement of such a member for a certain period of time as a reviewer, an administrator (manager), or the like. Hence, the performance arithmetic operation module 2034 performs various arithmetic operations, based on various parameters such as the number of created codes in the source code, the number of corrected codes, the number of pushes of the source code, the number of pull requests, the number of created issues, the number of reviews, the number of comments, the number of comment replies, and the number of commits that have been conducted on GitHub. For example, as an example of various arithmetic operations, the number of created codes in the source code, the number of corrected codes, the number of pushes of the source code, the number of pull requests, the number of created issues, the number of reviews, the number of comments, the number of comment replies, the number of commits, and the like that have been conducted by each member are added for each member who belongs to the engineer team.

The performance arithmetic operation module 2034 may simply add by piling up various parameters as the arithmetic operations based on the various parameters, or may perform an arithmetic operation of giving weighting to each parameter (for example, multiplying each parameter by a predetermined coefficient and then adding together). In addition, the weighting may be given to each parameter, based on a difficulty degree or an importance degree of a product (source code), and the above-described arithmetic operations may be performed.

The scoring module 2035 controls processing of specifying a parameter indicating an activity situation of an engineer team, based on the various parameters that have been acquired by the repository management module 2033. Here, the parameter (also referred to as a team score) denotes a value indicating an activity situation of the engineer team (for example, an achievement as an engineer team), and is a value specified by performing various arithmetic operations, based on histories of information that has been uploaded online by a member as an engineer of the engineer team to create a product and information of the review for the uploaded product that has been conducted by the member of the engineer team. As will be described below, the team score is presented in association with time-series information. Therefore, the scoring module 2035 specifies the team score for every certain period of time (for example, one week).

Specifically, as the information that has been uploaded online by the member as the engineer to create the product, the number of created codes in the source code, the number of corrected codes, the number of pushes of the source code, and the number of pull requests that have been conducted on GitHub by the entire team are counted for a certain period of time. Accordingly, it becomes possible to learn about the amount (the number of codes, the number of files, or the like) that has been created in the source code by such an engineer team for a certain period of time. Therefore, it is possible to estimate the activity situation in creating the products of the team, that is, the activity situation of the engineer team from a quantitative aspect of the product. In addition, as the information of the reviews for the uploaded products that have been conducted by the member of the engineer team, the number of created issues, the number of reviews, the number of comments, the number of comment replies, and the number of commits that have been conducted on GitHub of the entire team are counted for a certain period of time. That is, the activity situation of such a team is acquired by acquiring and piling up pieces of information about the products of the respective members. Accordingly, it becomes possible to learn about the amount that the engineer team conducts reviews (the number of comments) for a certain period of time. Therefore, it is possible to estimate a review situation for the products of the team, that is, the activity situation of the engineer team from a qualitative aspect of the product.

Note that the scoring module 2035 may specify the team score by giving weighting to the number of created codes in the source code, the number of corrected codes, the number of pushes of the source code, and the number of pull requests that have been conducted on GitHub, based on the difficulty degree or the importance degree of the product (source code). The difficulty degree and the importance degree of the source code may be calculated from, for example, the altered amount of the source code, the number of files influenced by the alteration in the source code, and the like, and may be estimated from the man-hour set in an issue related to a pull request with regard to the alteration in the source code, and the like. In such a case, the difficulty degree or the importance degree of the source code is desirably set to be higher as the altered amount in the source code is larger, the difficulty degree or the importance degree of the source code is desirably set to be higher as the number of files influenced by the alteration in the source code is larger, and the difficulty degree or the importance degree of the source code is desirably set to be higher as the number of man-hours set for the issue related to the pull request with regard to the alteration in the source code is larger. This is because it is considered that the time needed for creation, that is, the performance for fulfilling an achievement changes depending on the difficulty degree or the importance degree of the source code. In addition, the scoring module 2035 may specify the team score, based on a history of the number of remaining codes, after a predetermined period of time lapses since the creation. This is because the source code that remains after a certain period of time lapses is considered to be highly useful.

The alert determination module 2036 controls processing of determining an alert for an activity situation of an engineer team of which the user is notified, based on a change in the team score that has been specified by the scoring module 2035. The alert of which the user is notified denotes presenting matters worth paying attention to with regard to the activity situation of the engineer team, based on a change in the team score. For example, in a case where the team score that has been specified every week is an outlier that is in the outside of a certain range as compared with those of the other weeks, the alert determination module 2036 determines an alert based on the outlier. As a specific example, in a case where the team score of such a week falls within a range determined to be an outlier (for example, a decrease by 20% or more) as compared with those of the other weeks, it is estimated that the activity situation of the engineer team is sluggish as compared with the other weeks. Therefore, the alert determination module 2036 detects the outlier, and determines to give a notification of the outlier as an alert based on the detected outlier.

In addition, the alert determination module 2036 may detect a change in a value indicating the performance of a member who belongs to an engineer team, specifically, various parameters including the number of created codes, the number of corrected codes, the number of pushes, and the number of pull requests on GitHub, and may determine that the user is notified of an alert, based on the change. This is because a change in the performance of a member influences the activity situation of the engineer team, in many cases. Further, the alert determination module 2036 may detect changes in the number of reviews, a review time, and the number of comments between a certain member and another member who belong to the engineer team on GitHub, and may determine that the user is notified of an alert, based on the changes. This is because the review situation between specific members can influence the activity situation of the engineer team. Furthermore, the alert determination module 2036 may determine that the user is to be notified of an alert, based on a change in the personal score obtained by the performance arithmetic operation module 2034 having performed an arithmetic operation. This is because a change in comprehensive evaluation of the personal score may influence the activity situation of the engineer team.

The presentation module 2037 controls processing of presenting, to the user, a team score that indicates an activity situation of an engineer team and that has been specified by the scoring module 2035. For example, the presentation module 2037 transmits a changed situation of the team score every week to the terminal device 10 of the user via the communication unit 201 in order to present, to the user, the changed situation of the team score every week as time-series information. The presentation module 2037 may present, with regard to the team score, the changed situation of the team score for details such as the number of created codes and the number of pushes on GitHub.

The presentation module 2037 may acquire a lead time indicating a period of time from a review request to a close in the engineer team, as the activity situation of the engineer team, and may present the lead time to the user. This is to grasp a period of time, before subsequent processing (review or the like) for the product is performed, and a subsequent period of time. Here, when a review request for the product is made, another person different from the engineer who has created the product conducts a review, and writes a comment or the like. In the case of a normal process, when the product is corrected, based on a comment (the correction is not necessary depending on the case, or the review is not conducted depending on the case), decision making for reflecting the product is conducted, the merge is done, and then work of the product is closed. However, decision making for not reflecting the product is conducted for some reason such as a change in specifications, in some cases. In such cases, the work of the product is closed without a merge. Note that on GitHub or the like, a case where decision making has been conducted for a pull request without distinguishing between the presence or absence of a merge is called "close". However, in the present specification, a case where merge is not done, that is, decision making for ending the development work such as correction on a product without making a reply to a pull request is called "dismissal". The above lead time is a concept including a period of time from a review request to a close after the merge is done, and a period of time from a review request to a close after being dismissed without the merge. That is, "close" denotes a state in which some decision making has been done and the development work such as correction on a product has been completed, and includes a merge and a dismissal. Note that a product for which the above decision making has not been done is in a state of being left untouched. However, this state denotes a concept including a case where a review request has been made, but a review has not been done for a product, a case where a comment has not been corrected, a state in which the work has been completed, but the decision making for a merge or close has not been done, and a state in which a certain period of time has elapsed in these states.

In addition, the presentation module 2037 may acquire, as the activity situation of the engineer team, details indicating the transition of the product for which the review request is made by the engineer team, and may present the details to the user. As described above, when the review request is made, the state transitions from a state in which a pull request is made to a state in which the review is made, the state in which a reply to the review (a comment in response to a comment or correction of the product) is made, and to a state in which the merge is done. The transition of the product denotes a transition of a status (the respective states described above) of the product after the review request. In addition, the details indicating the transition of the product include details of the pull request that has transitioned to each status in the entire pull request to be a target. For example, among ten pull requests in total, information indicating that the review has been conducted on seven cases, the reply has been given to four of such seven cases, and the merge has been conducted on two of such four cases serves as the information indicating the transition of the product. This is to grasp whether subsequent processing (review or the like) is appropriately performed on the product. In addition, the presentation module 2037 may acquire, as the activity situation of the engineer team, a relationship between the number of comments on the product for which the review request has been made by the engineer team and a period of time to the close of the product, and may present the relationship to the user. This is to grasp how the relationship between the number of comments and the period of time to the close of the product is distributed and which case is an outlier. Furthermore, the presentation module 2037 may acquire, as the activity situation of the engineer team, a relationship between a reviewee who makes a review request in the engineer team and a reviewer who receives the review request, and may present the relationship to the user. This is to grasp the relationship between the reviewee and the reviewer and a load situation in the review.

In addition, the presentation module 2037 controls processing of presenting, to the user, an alert for the activity situation of the engineer team that has been determined by the alert determination module 2036. For example, the presentation module 2037 transmits an alert based on the changed situation of the team score every week to the terminal device 10 of the user via the communication unit 201, together with the changed situation in the team score.

Furthermore, the presentation module 2037 may present to the user, in association with the time-series information, the personal score that is obtained by the performance arithmetic operation module 2034 performing the arithmetic operation and that indicates the performance of the member who belongs to the engineer team. At this timing, the presentation module 2037 may make a presentation to correspond to the team score indicating the activity situation of the engineer team. This is to grasp the activity situation of the engineer team to correspond to the performance of the member. In addition, the presentation module 2037 may associate the team score indicating the activity situation of the engineer team with the time-series information, may associate a team score indicating an activity situation of another engineer team with the time-series information, and may present the team scores to the user in a comparable manner (for example, display in parallel). This is to grasp the activity situation of the engineer team by comparing with another team. In this situation, pieces of the time-series information of the both teams are not necessarily the ones in the same timing. This is because the activity timings are different between the teams, and it is easier to grasp the situation of the team by comparing with use of the lapses of the periods from the start timings of the projects of both teams. Furthermore, the presentation module 2037 may present, to the user, a lead time indicating a period of time from a review request is made, and a merge is done, to come to a close in the engineer team (here, excluding a period from the review request is made, but the merge is not done and dismissed to come to the close) as a reference, in a comparable manner (for example, display in parallel) with the lead time in another engineer team. This is to grasp a delivery situation of the product in the engineer team by comparing with another team. In this situation, the two lead times are not necessarily the ones in the same timing, and may be compared in different timings and different periods of time. This is because the timings and periods of time of the respective projects are usually different.

<2 Data Structure>

FIG. 4 is a diagram illustrating a data structure of the repository database 2021, which is stored in the server 20. In addition, FIG. 5 is a diagram illustrating data structures of the personal performance database 2022, which is stored in the server 20, and the team score database 2023, which is stored in the server 20.

As illustrated in FIG. 4, each record in the repository database 2021 includes an item "organization ID", an item "repository ID", an item "address", an item "update history information", and the like.

The item "organization ID" is information for identifying each organization such as a company, to which an engineer team of a development project or the like belongs, to be a target of various parameters acquired from the repository server 30 in the team activity evaluation system 1.

The item "repository ID" is information for identifying each repository to be set for every engineer team such as a development project to be a target of the various parameters acquired from the repository server 30 in the team activity evaluation system 1.

The item "address" is information indicating an address (URL) of the repository server 30, from which the various parameters are acquired in the team activity evaluation system 1, and an address of a remote repository that has been created for every project is stored. With this address, it becomes possible to identify a file name (README.txt or the like) common to every project.

The item "update history information" is information about an update history of the source code that is stored in the repository server 30, from which the various parameters are acquired in the team activity evaluation system 1, and specifically includes an item "action", an item "worker", an item "title", an item "source code", an item "created date and time information", an item "updated date and time information", and the like. The item "update history information" is action management information such as version management of the source code and comments on GitHub.

The item "action" is information of the type of an action for the source code stored in the repository server 30.

The item "worker" is information for identifying each user who has taken an action on the source code stored in the repository server 30.

The item "title" is information indicating the name of a work case, revision, correction, or the like that serves as the basis of the action.

The item "source code" is information indicating a file name of the source code on which the action has been taken.

The item "created date and time information" is information of the date and time when an action on the source code stored in the repository server 30 was taken.

The item "updated date and time information" is information of the date and time when an action was further taken on the source code stored in the repository server 30.

The repository management module 2033 of the server 20 updates the repository database 2021 in accordance with acquisition of log information from the repository server 30.

As illustrated in FIG. 5, each record of the personal performance database 2022 includes an item "member ID", an item "performance details", and the like.

The item "member ID" is information for identifying each member who belongs to the engineer team and who receives the presentation of the activity situation of the engineer team from the team activity evaluation system 1, and corresponds to the item "worker" in the repository database 2021.

The item "performance details" is information about an action that has been acquired from various parameters of log information on GitHub of a member who belongs to the engineer team and who receives the presentation of the activity situation of the engineer team from the team activity evaluation system 1, and specifically include an item "repository ID", an item "action", an item "partner member ID", an item "value", and the like.

The item "repository ID" is information for identifying each repository that is set for every engineer team, and corresponds to the item "repository ID" of the repository database 2021.

The item "action" is information of the type of an action on the source code stored in the repository server 30 that has been made by a member who belongs to the engineer team, and corresponds to the item "action" of the repository database 2021.

The item "partner member ID" is information for identifying a partner member in a case where there is the partner member who has taken the action, such as a review or a comment, on the source code stored in the repository server 30, and who is a member in the engineer team, and corresponds to the item "worker" of the repository database 2021.

An item "date information" is information of the date when an action was taken on the source code stored in the repository server 30.

The performance arithmetic operation module 2034 of the server 20 updates the personal performance database 2022 in accordance with an arithmetic operation of a personal score indicating the performance of a member who belongs to an engineer team.

Each record in the team score database 2023 includes an item "organization ID", an item "repository ID", an item "team member", an item "team detail information", and the like.

The item "organization ID" is information for identifying each organization such as a company, to which an engineer team belongs, and which is a higher-level item of the engineer team that receives the presentation of the activity situation of the engineer team from the team activity evaluation system 1, and corresponds to the item "organization ID" of the repository database 2021.

The item "repository ID" is information for identifying each engineer team such as a development project, which is a target of the various parameters to be acquired from the repository server 30 in the team activity evaluation system 1, and corresponds to the item "repository ID" of the repository database 2021.

The item "team member" is information for identifying each member who belongs to the engineer team and who receives the presentation of the activity situation of the engineer team from the team activity evaluation system 1, and corresponds to the item "member ID" of the personal performance database 2022.

The item "team detail information" is information about the engineer team that receives the presentation of the activity situation of the engineer team from the team activity evaluation system 1, and specifically includes an item "date", an item "the number of pull requests", an item "the number of merges", an item "the number of commits", an item "the number of reviews", and the like. Note that the item "number of pull requests", the item "the number of merges", the item "the number of commits", and the item "the number of reviews" are examples of the various parameters on GitHub, and any other parameter may be stored.

The item "date" is information indicating a date when the activity situation related to the engineer team is acquired and aggregated every day.

The item "the number of pull requests" is information of the number of pull requests on such a date in the engineer team acquired from GitHub.

The item "the number of merges" is information of the number of merges on such a date in the engineer team acquired from GitHub.

The item "the number of commits" is information of the number of commits on such a date in the engineer team acquired from GitHub.

The item "the number of reviews" is information of the number of reviews on such a date in the engineer team acquired from GitHub.

Note that regarding "the number of pull requests", the item "the number of merges", the item "the number of commits", and the item "the number of reviews", values themselves acquired from GitHub may be stored, or values that have been subjected to predetermined weighting may be stored.

In addition, although illustration is omitted, information of the alert that has been determined by the alert determination module 2036 may be stored in the team score database 2023.

Note that in a case where the performance arithmetic operation module 2034 and the scoring module 2035 perform processing of aggregating the activity situation of the engineer team that has been acquired from the repository database 2021 and presenting the activity situation without a change by use of the presentation module 2037, the personal performance database 2022 or the team score database 2023 does not have to be provided. The personal performance database 2022 and the team score database 2023 store aggregated values beforehand so that the activity situation of the engineer team can be presented immediately, even though the date or the period for presenting the activity situation of the engineer team is changed, as will be described later.

The scoring module 2035 of the server 20 updates the scoring module 2035 in accordance with specifying of the team score indicating the activity situation of the engineer team.

<3 Operation>

Hereinafter, referring to FIGS. 6 and 7, scoring processing and presentation processing of the team activity situation by the team activity evaluation system 1 in the first embodiment will be described.

Figure 6:
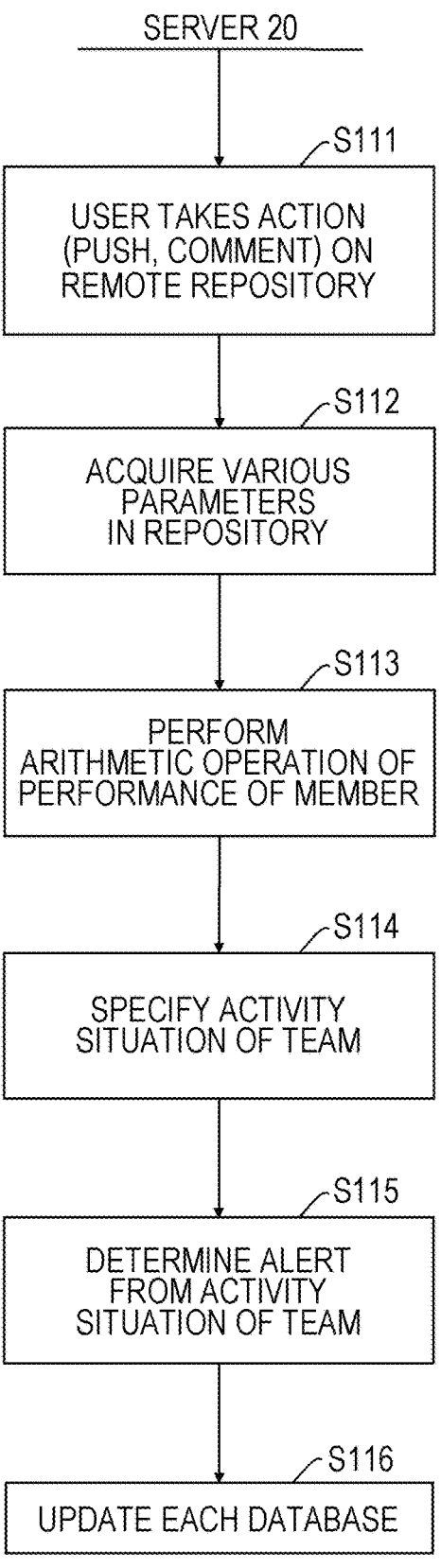
FIG. 6 is a flowchart illustrating an example of a flow in performing scoring processing by the team activity evaluation system 1 in the first embodiment.

FIG. 6 is a flowchart illustrating an example of a flow of performing the scoring processing by the team activity evaluation system 1 in the first embodiment.

In step S111, a user operates the terminal device 10 to take an action such as a push or a comment from a local repository on GitHub to a remote repository of the repository server 30, and the input operation reception unit 171 of the terminal device 10 receives an instruction for the action from the user. The transmission and reception unit 172 transmits information of the action that has been received to the server 20. The server 20 receives information of the action via the communication unit 201.

In step S112, the repository management module 2033 of the server 20 accesses the repository server 30, and transmits a request signal in order to acquire various parameters of each member of the team, such as the number of pushes of the source code and the number of pull requests that are recorded in the repository server 30. The repository management module 2033 acquires various parameters from the repository server 30 via the communication unit 201.

In step S113, the performance arithmetic operation module 2034 of the server 20 performs an arithmetic operation of a value (personal score) indicating the performance of the member who belongs to the engineer team, based on the various parameters on GitHub acquired in step S112.

In step S114, the scoring module 2035 of the server 20 specifies a team score indicating the activity situation of the engineer team, based on the various parameters on GitHub acquired in step S112.

In step S115, the alert determination module 2036 of the server 20 determines an alert of the activity situation of the engineer team of which the user is notified, based on a change in the team score specified in step S114.

In step S116, the repository management module 2033 of the server 20 stores the various parameters acquired in step S112, in the repository database 2021. The performance arithmetic operation module 2034 stores the personal score subjected to the arithmetic operation in step S113, in the personal performance database 2022. The scoring module 2035 stores the team score specified in step S114, in the team score database 2023. The alert determination module 2036 stores the information of the alert determined in step S115, in the team score database 2023.

As described above, the team activity evaluation system 1 performs an arithmetic operation of the personal score of each member, based on the various parameters that are pieces of the log information of the product on GitHub, and specifies the team score. Accordingly, it becomes possible to grasp the activity situation of the team.

Figure 7:
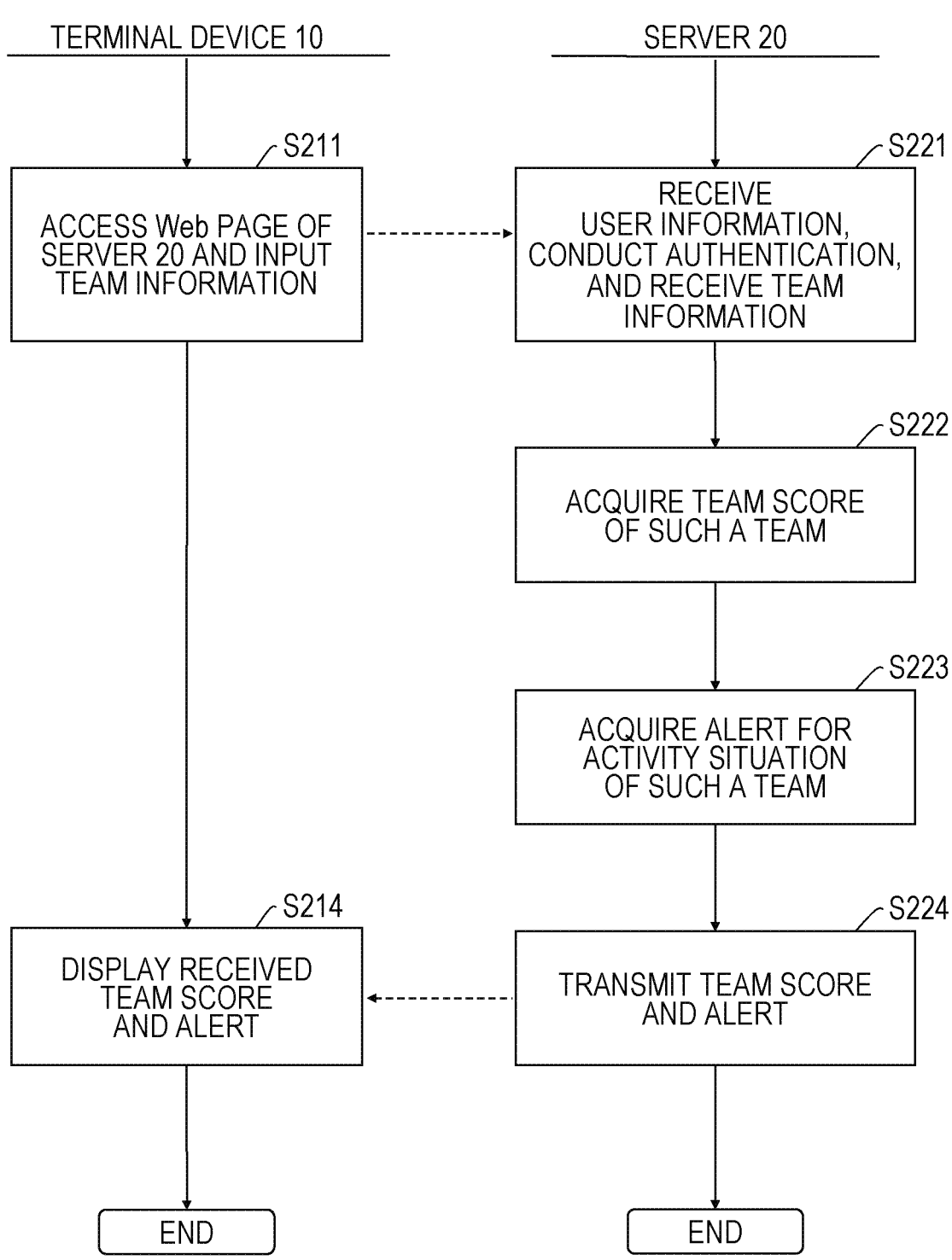
FIG. 7 is a flowchart illustrating an example of a flow in performing presentation processing of a team activity situation by the team activity evaluation system in the first embodiment.

FIG. 7 is a flowchart illustrating an example of a flow of the presentation processing of a team activity situation by the team activity evaluation system 1 in the first embodiment.

As a precondition of performing the processing of step S211, user registration to sign-in to the team activity evaluation system 1 is conducted. The input operation reception unit 171 of the terminal device 10 receives, from a user, information inputs of an ID (which may be a temporary one), an e-mail address, and a password to sign-in to the team activity evaluation system 1. The transmission and reception unit 172 transmits the user ID and the password that have been received and information of an engineer team of the user to the server 20. The server 20 receives the ID, the e-mail address, and the password that have been transmitted via the communication unit 201, and registers user information. The input operation reception unit 171 of the terminal device 10 receives a selection for GitHub or another service as a service to be cooperated with, receives a selection for an organization (company or the like) registered in such a service and selections for an engineer team to be linked with such an organization, a member (constituent member), and a repository linked with the organization, and transmits the selections to the server 20. The server 20 receives the various pieces of selection information that have been transmitted via the communication unit 201, and registers selection information.

In step S211, the input operation reception unit 171 of the terminal device 10 receives, from the user, inputs of information of the organization ID, the e-mail address, and the password to sign-in to the team activity evaluation system 1. The transmission and reception unit 172 transmits the information of the organization ID, the e-mail address, and the password that have been received to the server 20.

In step S221, the server 20 receives the organization ID, the e-mail address, and the password via the communication unit 201, conducts predetermined authentication, and accepts sign-in of the user.

In step S222, the presentation module 2037 of the server 20 reads and acquires the team score specified in step S114 from the team score database 2023, with regard to the engineer team that has been selected by the user. Note that in acquiring the team score, the latest team score of the engineer team may be specified and acquired.

In step S223, the presentation module 2037 of the server 20 reads and acquires an alert of the activity situation of the engineer team determined in step S115 from the team score database 2023. Note that in acquiring the alert, the alert may be determined and acquired from the latest team score of the engineer team.

In step S224, the presentation module 2037 of the server 20 transmits the team score specified in step S222 and the alert determined in step S223 to the terminal device 10 via the communication unit 201 in order to present them to the user.

In step S214, the transmission and reception unit 172 of the terminal device 10 receives the team score and the alert, which have been transmitted from the server 20, with regard to the engineer team to which the user belongs. The notification control unit 174 causes the display 132 to display the team score and the alert that have been received.

As described above, the team activity evaluation system 1 specifies the time-series team score of the engineer team, based on the various parameters corresponding to log information of the products on GitHub. Accordingly, it becomes possible to grasp the activity situation of the team.

4 Screen Example

Hereinafter, referring to FIGS. 8 to 19, screen examples of the presentation processing of a team activity situation by the team activity evaluation system 1 will be described.

Figure 8:
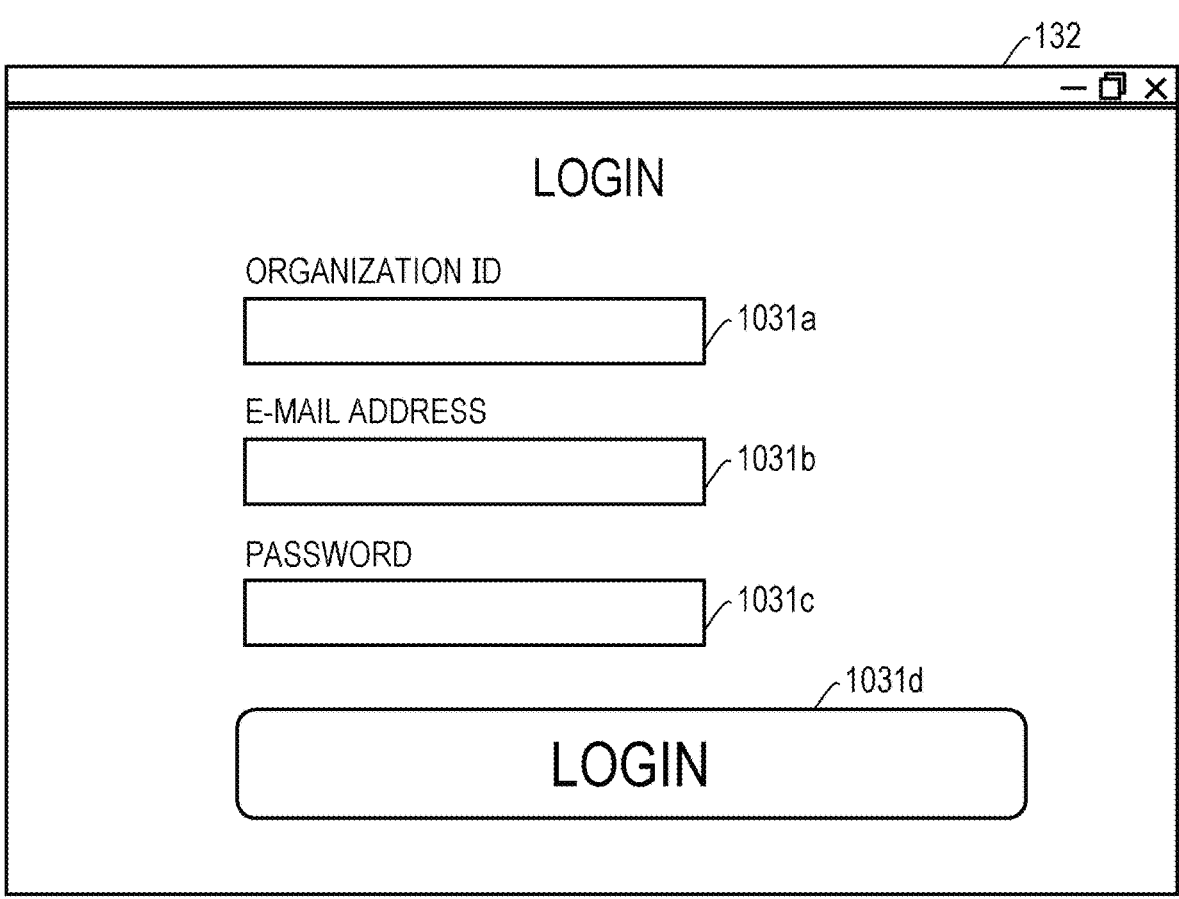
FIG. 8 is a diagram illustrating an example of a sign-in screen to be displayed on the terminal device.

FIG. 8 is a diagram illustrating an example of a sign-in screen to be displayed on the terminal device 10. The screen example of FIG. 8 illustrates a screen example to be displayed when a user who is to receive the presentation of the activity situation of the engineer team signs in to the team activity evaluation system 1. This step corresponds to step S211 in FIG. 7.

As illustrated in FIG. 8, on the display 132 of the terminal device 10, an organization ID input field 1031a of a company or the like to which the engineer team belongs, an e-mail address input field 1031b of a registered user, a password input field 1031c of the user, and a login transition button 1031d for logging in are arranged in order to receive the presentation of the activity situation of the engineer team on GitHub.

The user inputs an organization ID, an e-mail address, and a password into the organization ID input field 1031a, the e-mail address input field 1031b, and the password input field 1031c of the user, respectively, and presses the screen transition button 1031d to log in to the server 20. Then, the screen transitions to a screen that displays the activity situation of the engineer team.

Figure 9:
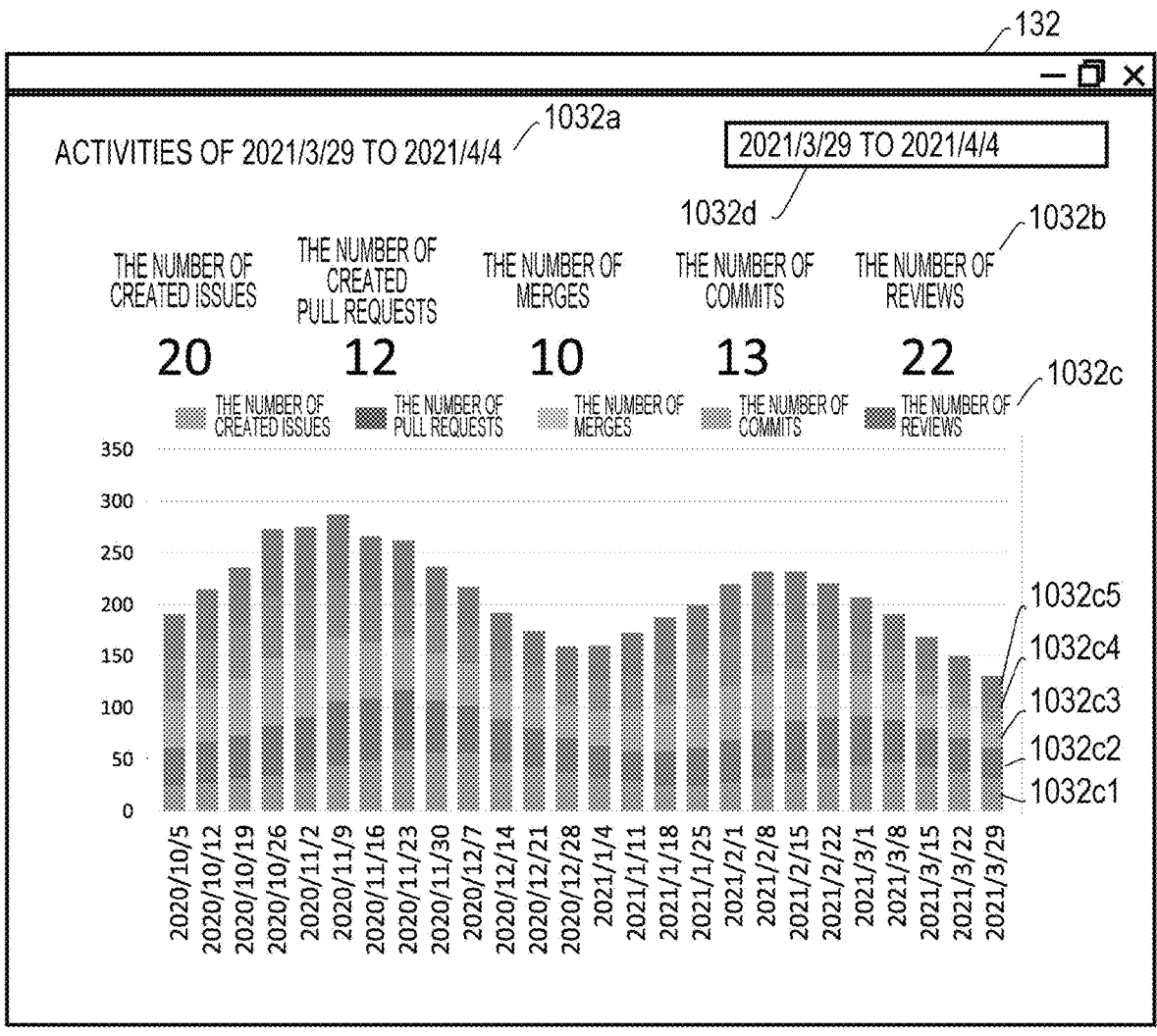
FIG. 9 is a diagram illustrating a display screen example of the team activity situation to be displayed on the terminal device.

FIG. 9 is a diagram illustrating a display screen example of the team activity situation to be displayed on the terminal device 10. The screen example of FIG. 9 illustrates a screen example in a state of displaying a team score for a certain period of time and a time-series change in the team score. This step corresponds to step S214 in FIG. 7.

As illustrated in FIG. 9, in response to an instruction operation for displaying the activity situation of the engineer team, the display 132 of the terminal device 10 displays a period display field 1032a for displaying a period of time while the activity situation of the engineer team is specified, a score display field 1032b for displaying details of the team score indicating the activity situation (performance) of the engineer team, a time-series change display field 1032c for indicating a total value of the team score that is the activity situation of the engineer team and changes in its details in a time-series manner, and a period change input field 1032d for receiving a change of the period of time while the activity situation of the engineer team is specified.

The period of time displayed in the period display field 1032a is a period of time indicated by a start date and an end date of the period of time while the respective scores displayed in the score display field 1032b have been acquired, and as an example, the start date and the end date of one week are displayed. The scores displayed in the score display field 1032b corresponds to various parameters that have been acquired from GitHub, and as an example, the number of created issues, the number of pull requests, the number of merges, the number of commits, and the number of reviews for the period of time displayed in the period display field 1032a are displayed. As an example, in FIG. 9, various parameters for the period of time displayed in the period display field 1032a are compared with various parameters for a previous period of time, and the numbers of changes are displayed. Other than the above example, the total number of the various parameters for a specific period of time may be displayed, or how much a cumulative value from a certain time point has increased from a previous time point may be displayed. Regarding the time-series changes displayed in the time-series change display field 1032c, weekly changes in the various parameters are displayed in stacked bar graphs. The horizontal axis represents time-series changes (for example, one element indicates one week) and the vertical axis represents values of the score. In the stacked bar graphs in the time-series change display field 1032c, as elements similar to the parameters displayed in the score display field 1032b, weekly changes in the number of created issues 1032c1, the number of pull requests 1032c2, the number of merges 1032c3, the number of commits 1032c4, and the number of reviews 1032c5 are stacked and displayed, and changes in the total value are also displayed. In the example of FIG. 9, the changes for six months are displayed.

In addition, the period of time displayed in the period display field 1032a is configured to be changeable by an input into the period change input field 1032d. For example, the period change input field 1032d is configured to enable a pull-down selection for every predetermined period. By selecting a period of time, such a period of time is displayed in the period display field 1032a, and various parameters of such a period of time are displayed in the score display field 1032b. Further, the time-series change display field 1032c may display a time-series change to be back in the past from the period that has been changed by the input into the period change input field 1032d, and may change and display the values indicated by the number of created issues 1032c1, the number of pull requests 1032c2, the number of merges 1032c3, the number of commits 1032c4, and the number of reviews 1032c5. Furthermore, regarding the period of time displayed in the period display field 1032a and the period to be selectable by the period change input field 1032d, they may also be configured to be changeable. In the example of FIG. 9, the period of time is displayed for every week. However, the period of time may be changed to every day, every ten days, or every month. With the display of such a time-series change display field 1032c, the user is able to grasp changes in the activity situation of the engineer team.

Figure 10:
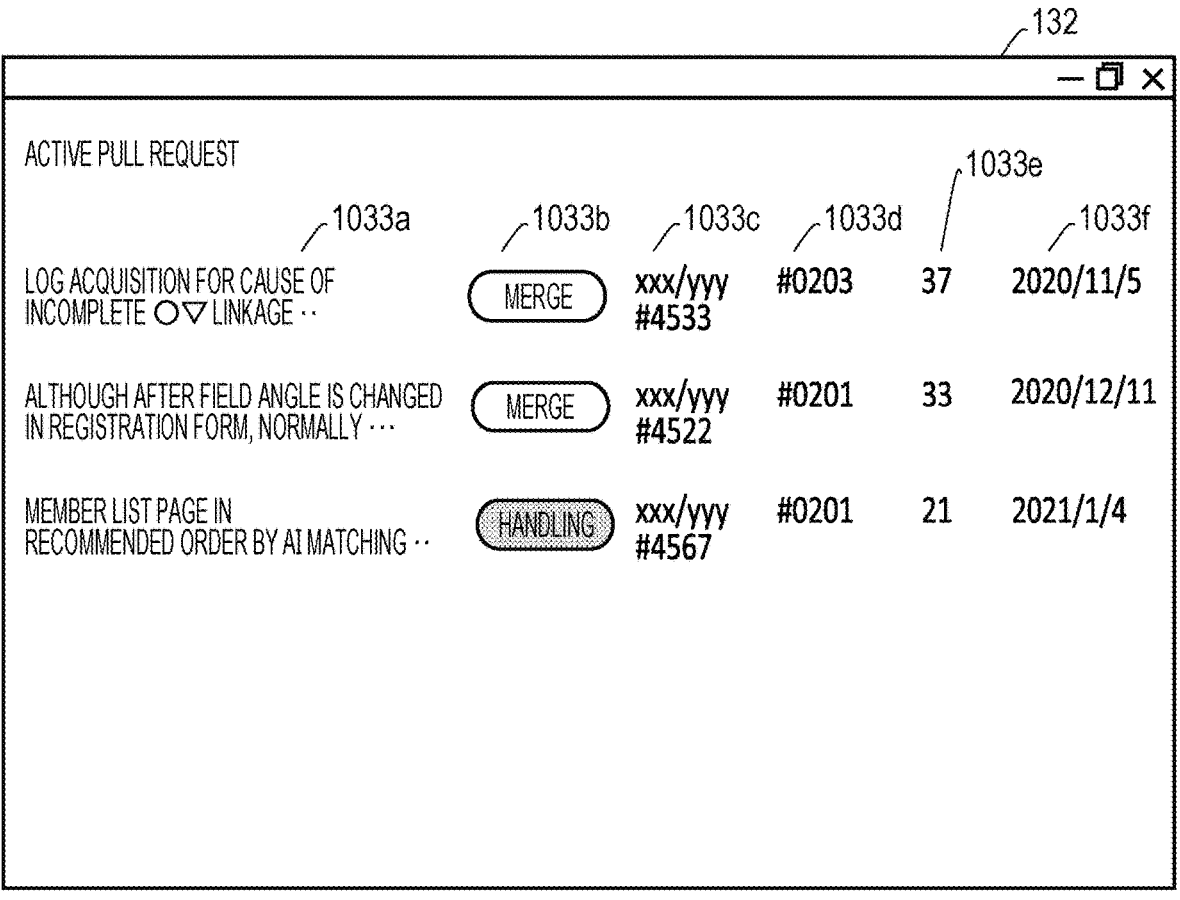
FIG. 10 is a diagram illustrating a display screen example of a pull request situation to be displayed on the terminal device.

FIG. 10 is a diagram illustrating a display screen example of a pull request situation to be displayed on the terminal device 10. The screen example of FIG. 10 illustrates a screen example of displaying the pull request situation of the source code in the engineer team, and is displayed by scrolling or separately transitioning the screen from the screen example of FIG. 9, for example.

As illustrated in FIG. 10, active (some measures are being taken) pull requests in the engineer team are extracted, and a list of pull requests with a large number of comments is displayed as examples in such a situation on the display 132 of the terminal device 10. Specifically, a title display field 1033a for indicating a title of a pull request, a state display field 1033b for indicating a handling state of the pull request, a link display field 1033c for displaying a link to a source code corresponding to the pull request, a member display field 1033d for indicating a member who has made the pull request, a number of comment number display field 1033e for indicating the number of comments on the pull request, and an updated date display field 1033f for displaying the last updated date of the pull request are displayed.

On the screen illustrated in FIG. 10, for example, a title of the pull request indicated in the title display field 1033a, a handling state of the pull request indicated in the state display field 1033b, and the like are displayed in descending order in the number of comments displayed in the comment number display field 1033e. Displaying in this manner is, for example, to grasp the pull requests that are actively reviewed. A pull request for which a large number of comments are made indicates a favorable tendency due to active discussion, in some cases. However, for example, in a case where the number of comments is greatly increased in a specific period of time (one day), some kinds of a large number of communication have been needed because of inconsistency in recognition between a reviewer and a reviewee, in some cases. Therefore, it is not possible to determine whether such a state is good or bad unconditionally. For this reason, displaying in this manner is to grasp that the review has been actively done. For example, in a case where the number of comments increases in an extraordinary pace, a display mode of the comment number display field 1033e may be changed and displayed (for example, colored in red). Note that as illustrated in FIG. 10, the display mode of the state display field 1033b may be changed and displayed (for example, changed in color) in accordance with the handling state of the pull request.

Figure 11:
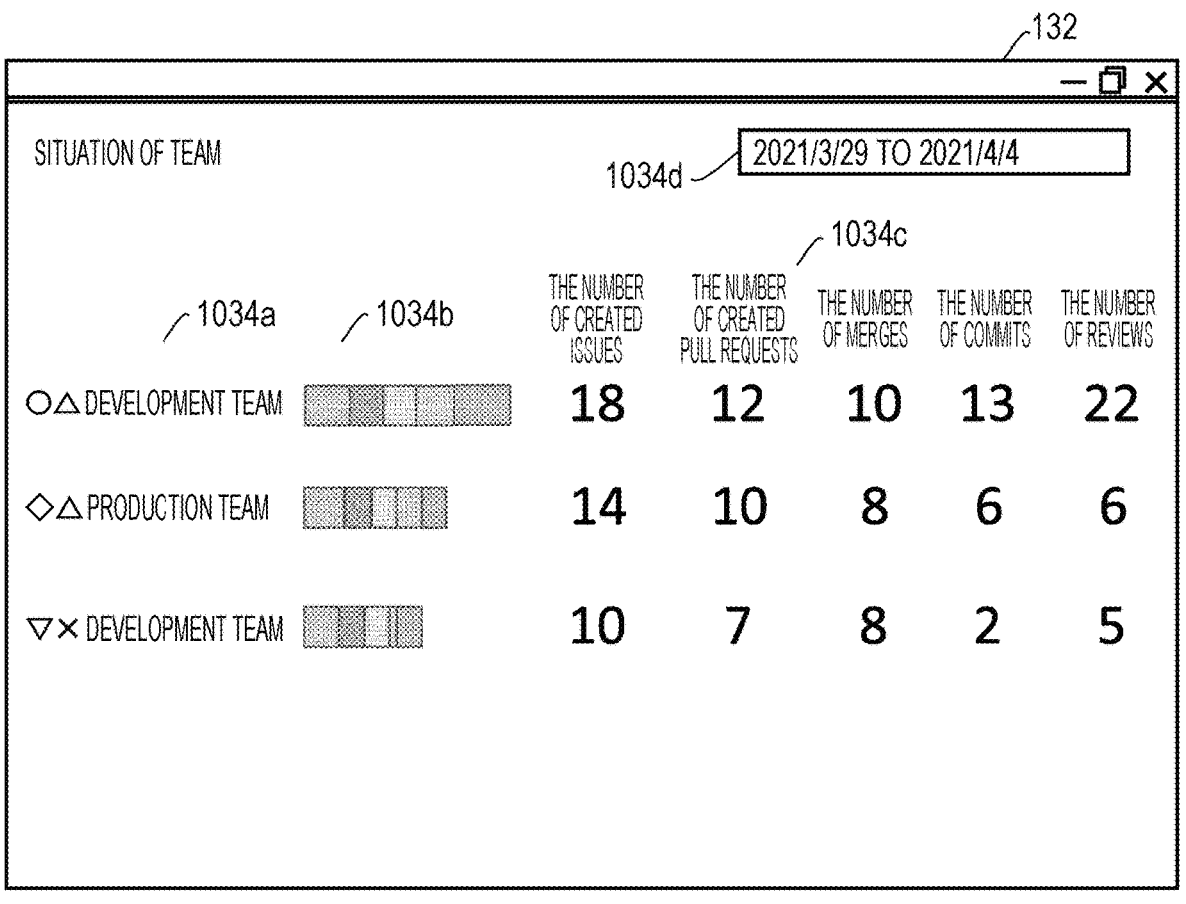
FIG. 11 is a diagram illustrating a display screen example of another team situation to be displayed on the terminal device.

FIG. 11 is a diagram illustrating a display screen example of another team situation to be displayed on the terminal device 10. The screen example of FIG. 11 illustrates a screen example in a state of displaying the team scores of such an engineer team and other engineer teams for a certain period of time, and is displayed by scrolling or separately transitioning the screen from the screen example of FIG. 9, for example.

As illustrated in FIG. 11, the display 132 of the terminal device 10 displays a team name display field 1034a for indicating such an engineer team and other engineer teams for a predetermined period of time, a graph display field 1034b for representing the total values and the details that are the activity situations of the respective engineer teams in horizontal bar graphs, a score display field 1034c for displaying the details of the team scores indicating the activity situations of the respective engineer teams, and a period change input field 1034d for receiving a change of the period of time.

The scores displayed in the score display field 1034c are the various parameters that have been acquired from GitHub, and as examples, the number of created issues, the number of pull requests, the number of merges, the number of commits, and the number of reviews are displayed. In the graph display field 1034b, a horizontal bar graph in which the scores displayed in the score display field 1034c are stacked rightward is displayed. In addition, similarly to the period change input field 1032d illustrated in FIG. 9, the aggregation periods of time of aggregating the numbers displayed in the graph display field 1034b and the score display field 1034c are configured to be changeable by an input into the period change input field 1034d. With the display of the graph display field 1034b, it becomes possible to grasp the activity situations of the respective teams at a glance, and to grasp that the team is active in the activity situation in accordance with the length of the bar in the horizontal bar graph.

Figure 12:
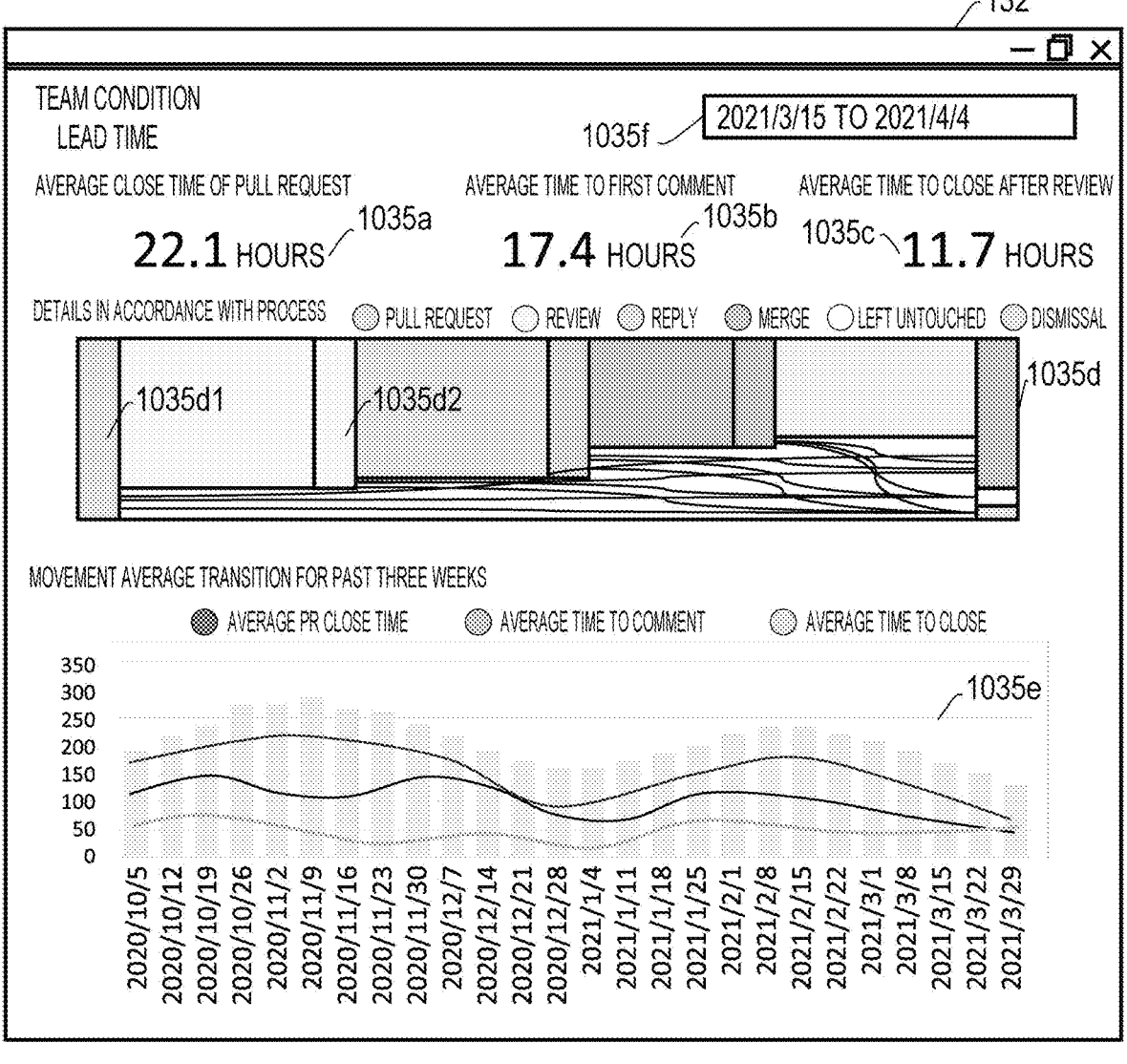
FIG. 12 is a diagram illustrating a display screen example of a lead time and the pull request situation to be displayed on the terminal device.

In FIG. 12, (a) is a diagram illustrating a display screen example of a lead time and the pull request situation to be displayed on the terminal device 10, and (b) is a diagram illustrating another display example of a diagram display field 1035d illustrated in FIG. 12(a). The screen example of FIG. 12 illustrates a screen example in a state of displaying a lead time indicating a period of time from a pull request (review request) for the source code that is the product of an engineer team to a close, a transition of the source code for which the pull request has been made, and a time transition of the lead time. The screen example of FIG. 12 is displayed by scrolling or separately transitioning the screen from the screen example of FIG. 9, for example.

As illustrated in FIG. 12(a), the display 132 of the terminal device 10 displays, as the activity situation (team score) of the engineer team, a lead time display field 1035a for indicating an average value of the lead times in the engineer team, a comment time display field 1035b for indicating an average time until a first comment is made for the source code for which the pull request has been made, a close time display field 1035c for indicating an average time from a review to a close, the diagram display field 1035d for displaying a transition of the source code for which the pull request has been made, a movement average display field

1035e for displaying movement average time of the lead time, the time to the first comment, and the time from the review to the close, and a period change input field 1035f for receiving a change of the period of time. The average times displayed in the lead time display field 1035a, the comment time display field 1035b, and the close time display field 1035c are average values of the respective values of the engineer team for a predetermined period of time (for example, three weeks).

The information of the transition displayed in the diagram display field 1035d indicates how the source code for which the pull request has been made transitions to a state in which the source code is closed or left untouched after the pull request was made. More specifically, from the state (status) in which the pull request was made, the status transitions to which one of a state in which a review has been received thereafter, a state in which a reply to the review has been made, a state in which a merge has been done and then closed, a state in which a dismissal has been decided and closed, and a state of being left untouched without a close is expressed by a method called a Sankey diagram. For example, a rectangle 1035d1 on the left side represents the number of cases of the source code for which the pull request has been made by the length in the vertical direction, and a rectangle 1035d2 represents the number of cases of the source code that have transitioned to the reviewed state by the length in the vertical direction among the number of cases of the source code for which the pull request has been made. That is, the difference between the number of cases indicated by the rectangle 1035d1 and the number of cases indicated by the rectangle 1035d2 indicates the number of cases of the source code that have not been reviewed, and includes the number of cases of the source code that have been left untouched without being reviewed and that have been closed without being reviewed. In addition, a curved line connecting the rectangles indicates the transition of the status as described above. Note that the same applies to subsequent statuses. Furthermore, it may be configured such that an attribute and the number of cases indicated by each rectangle or curved line are displayed by superimposing a mouse pointer on each rectangle or curved line (roll over). With the information of the transition of the source code (product) for which the pull request (review request) has been made to be displayed in the diagram display field 1035d, it is possible to grasp at a glance whether subsequent processes (review and the like) for the product is appropriately performed as the activity situation in the engineer team.

The movement average time displayed in the movement average display field 1035e indicate movement average periods of the respective periods for a predetermined period of time (for example, three weeks) in the engineer team in bar graphs and approximate curved lines. The vertical axis represents the number of cases and the horizontal axis represents the passage of time (time-series). Regarding a section used for calculating the movement average can be set variously, but for example, the movement average is desirably calculated for every seven days in order to exclude changes that occur every day of week in the engineering work. However, in a case where the transition is checked from a longer-term viewpoint, a movement average is desirably set every three weeks. Note that regarding a predetermined period of time obtained by correcting the average time displayed in the lead time display field 1035a, the comment time display field 1035b, and the close time display field 1035c, the information of the transition displayed in the diagram display field 1035d, and the movement average time displayed in the movement average display field 1035e, the timing and the period of time may also be configured to be changeable. In addition, similarly to the period change input field 1032d illustrated in FIG. 9, regarding the aggregation periods of respectively aggregat- ing the time of the lead time display field 1035a, the comment time display field 1035b, the close time display field 1035c, the diagram display field 1035d, and the move- ment average display field 1035e, which are being dis- played, they are configured to be changeable by an input into the period change input field 1035f. With the average time displayed in the lead time display field 1035a, the comment time display field 1035b, and the close time display field 1035c, it becomes possible to grasp at a glance the time until the subsequent processes (review and the like) for the product is conducted and the time thereafter, as the activity situation in the engineer team. With the movement average time displayed in the movement average display field 1035e, it becomes possible to grasp the time-series transition.

In addition, as illustrated in FIG. 12(b), the information of the transition displayed in the diagram display field 1035d may be displayed by separating only specific elements so that such a state can be easily grasped. In the example of FIG. 12(b), a right-side rectangle 1035d3 for indicating the number of cases of the source code in a merged state for such a period of time, a right-side rectangle 1035d4 for indicating the number of cases of the source code in a dismissed and closed state for such a period of time, and a right-side rectangle 1035d5 for indicating the number cases of the source code that are left untouched for such a period of time are displayed, and only the rectangle 1035d5 for indicating the number of cases that are left untouched is displayed to be spaced apart rightward and downward. A plurality of elements may be spaced apart, and each rectangle may be configured to be selectable by clicking with a mouse or the like. With such a configuration, it is possible to grasp at a glance a specific state (left untouched, separation, or the like) of the product as an activity situation in the engineer team.

Figure 13:
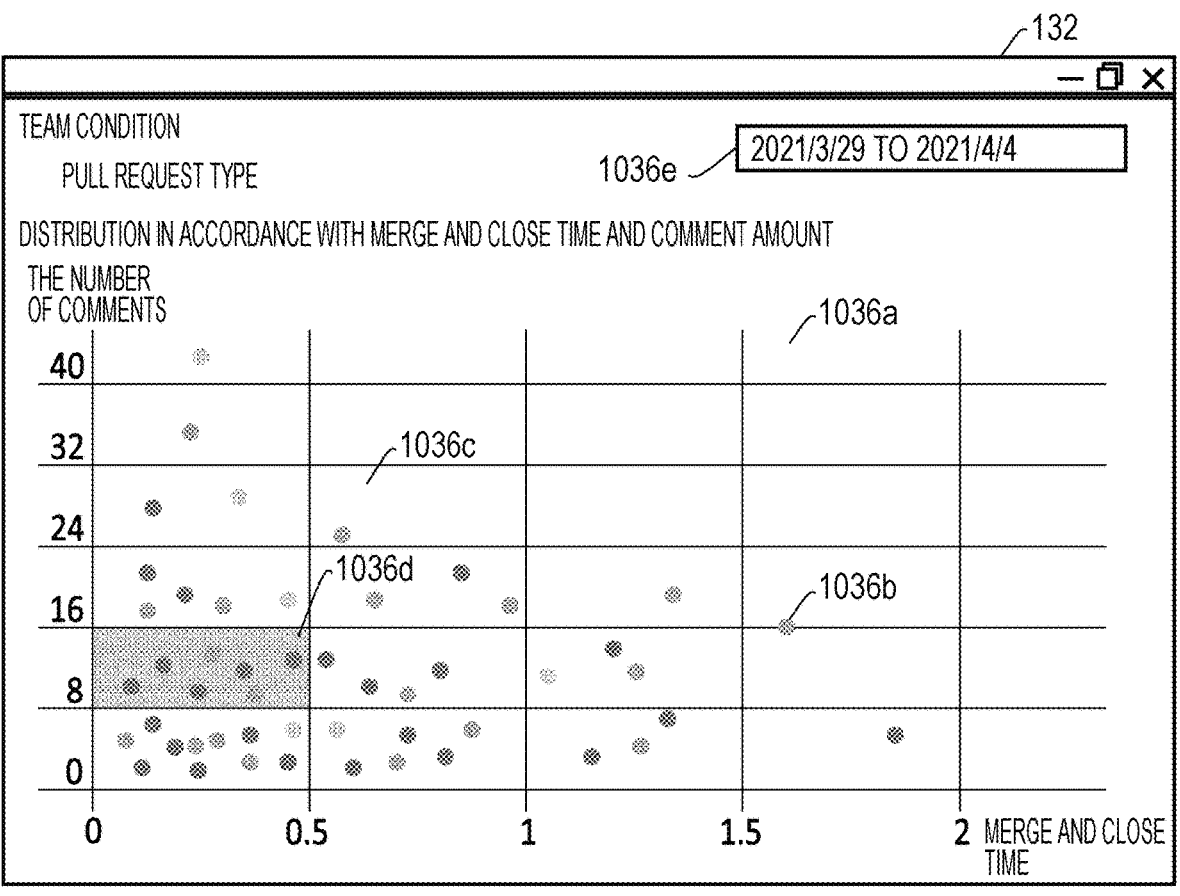
FIG. 13 is a diagram illustrating a display screen example of the situation of a pull request type to be displayed on the terminal device.

FIG. 13 is a diagram illustrating a display screen example of the situation of a pull request type to be displayed on the terminal device 10. The screen example of FIG. 13 illus- trates a screen example in a state of displaying a relationship between the number of comments for the pull request (review request) and a period of time to a merge and close in the engineer team in a scatter diagram, and is displayed by scrolling or separately transitioning the screen from the screen example of FIG. 9, for example.

Figure 14:
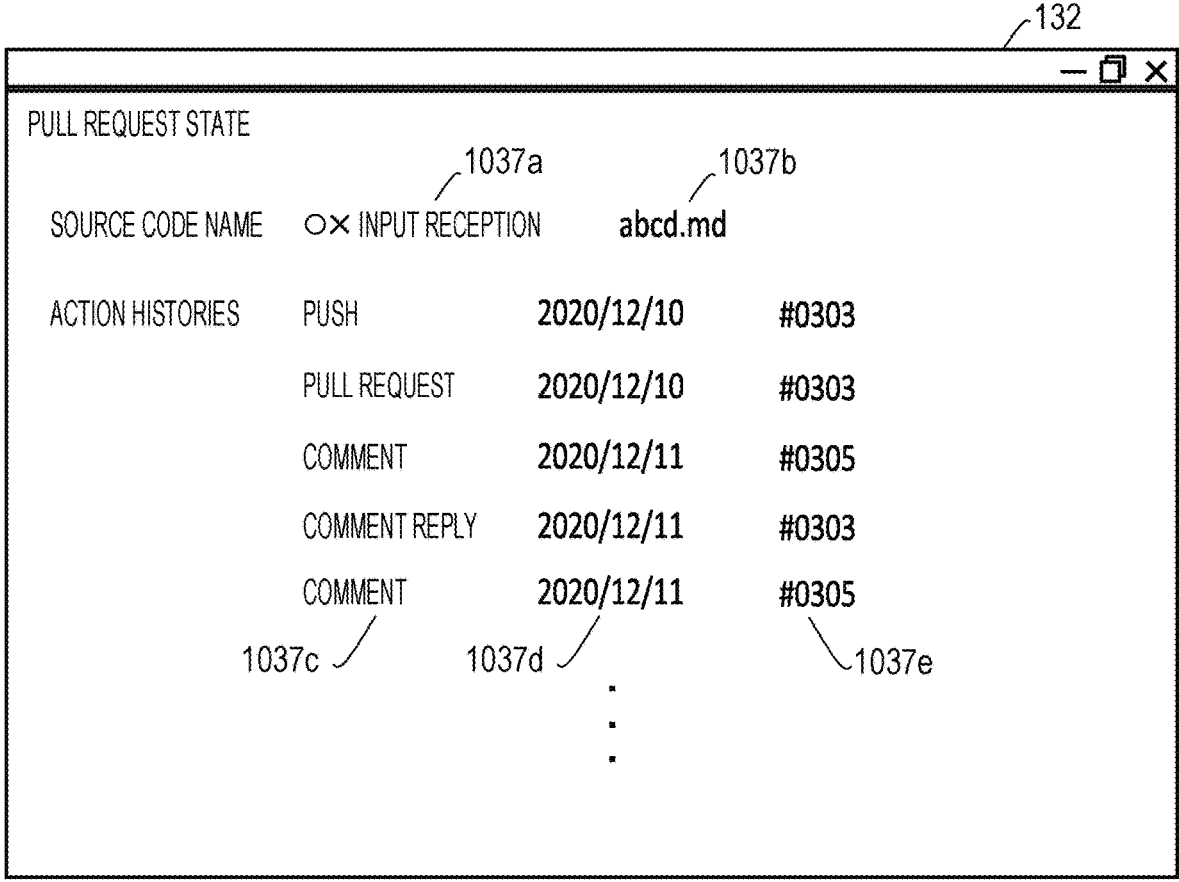
FIG. 14 is a view illustrating a display screen example of the pull request state to be displayed on the terminal device.

As illustrated in FIG. 13, the display 132 of the terminal device 10 displays a scatter diagram 1036a as an activity situation of the engineer team for a predetermined period of time. In the scatter diagram 1036a, the vertical axis repre- sents the number of comments for each pull request, the horizontal axis represents the lead time of each pull request (in the drawing, written as merge and close time), and the respective pull requests within the predetermined period of time in the team are plotted. For example, a pull request indicated by a point 1036b in FIG. 13 indicates that the number of comments is 16 and the lead time is 1.6 hours. In addition, a period change input field 1036e for receiving a change of the predetermined period of time is displayed. Note that regarding the scatter diagram 1036a, it may be configured such that the number of comments and the periods of time to the merge and close indicated by each point are displayed by superimposing the mouse pointer on the point 1036b (roll over), or it may be configured to transition to a screen indicating the pull request state as illustrated in FIG. 14 as will be described later, by clicking with the mouse or the like. Furthermore, the scatter diagram 1036a may be configured such that points that are elements are selectable (in order to grasp an outlier), by selecting a predetermined frame 1036c, which is surrounded by gradu- ation lines. Further, in selecting the predetermined frame 1036c, one frame 1036c may be configured to be selectable, or a plurality of frames 1036c may be configured to be selectable (for example, by an operation of dragging and selecting, or an operation of selecting while pressing a shift key). Furthermore, a representative value (for example, an average value, a median value, or the like) of the number of comments and the periods of time to a merge and close of a certain engineer team may be set in a statistical method, and an area having a smaller number of comments or a shorter lead time than the representative value may be displayed in a different display mode (for example, changed in color) as illustrated in a frame 1036d. With the scatter diagram 1036a, it is possible to grasp at a glance how the relationship between the number of comments and the period of time to the merge and close is distributed and which an outlier is among them.

FIG. 14 is a diagram illustrating a display screen example in the pull request state to be displayed on the terminal device 10. The screen example of FIG. 14 illustrates a screen example in a state of displaying the pull request state in the engineer team in a list format, and is displayed by selecting, for example, the point 1036b of FIG. 13 by clicking or the like.

As illustrated in FIG. 14, the display 132 of the terminal device 10 displays a title display field 1037a of the source code to be a target for the pull request, a file name display field 1037b of the source code, an action display field 1037c on the source code, a date display field 1037d of the date when the action was taken, and a member display field 1037e of a member who has taken the action. The action display field 1037c, the date display field 1037d, and the member display field 1037e correspond to, for example, history information acquired from the personal performance database 2022. With such a configuration, it is possible to grasp the situation at a glance for every pull request (source code).

Figure 15:
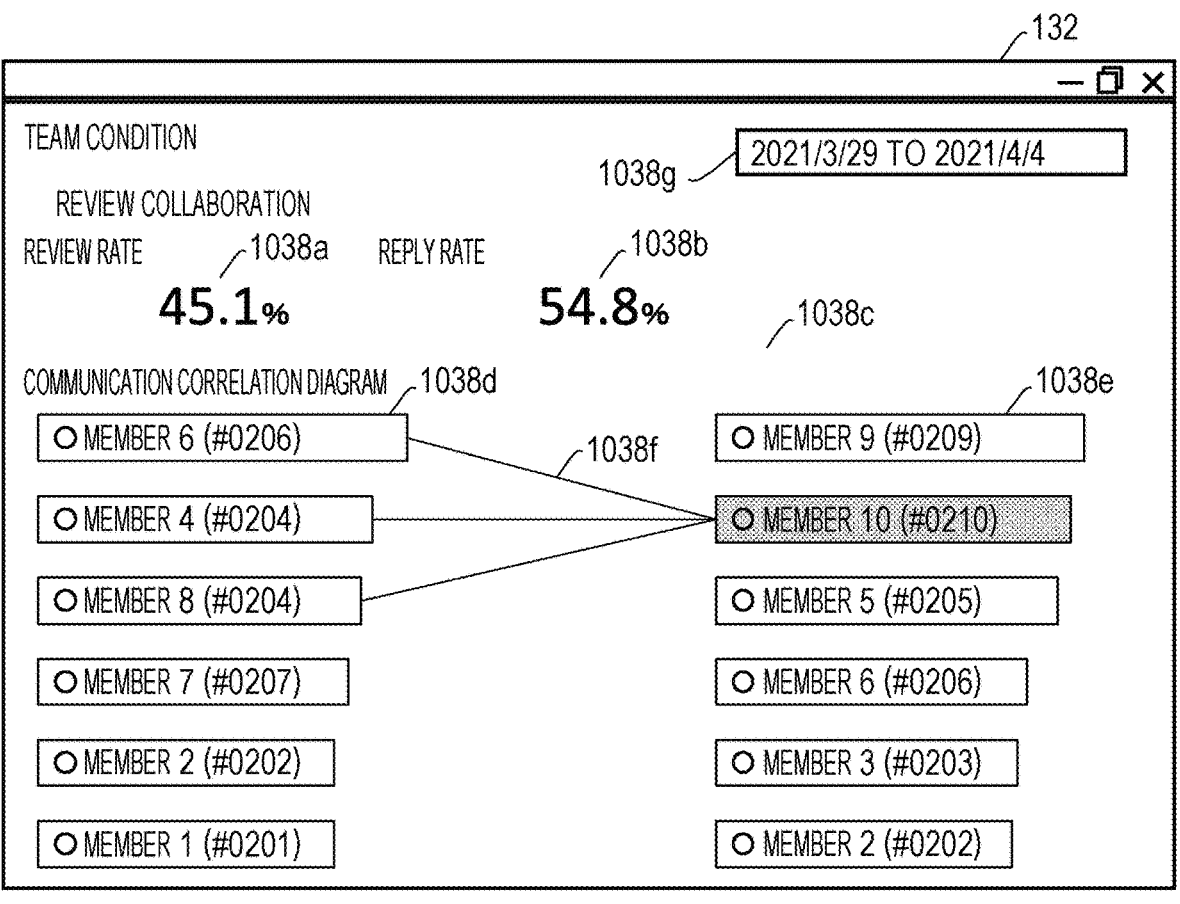
FIG. 15 is a diagram illustrating a display screen example of a review conducted situation to be displayed on the terminal device.

FIG. 15 is a diagram illustrating a display screen example of a review conducted situation to be displayed on the terminal device 10. The screen example of FIG. 15 illus- trates a screen example in a state of displaying the review conduction rate, a reply rate to the review, and a relationship between a reviewee and a reviewer in the engineer team, and is displayed by scrolling or separately transitioning the screen from the screen example of FIG. 9, for example.

As illustrated in FIG. 15, the display 132 of the terminal device 10 displays a review rate display field 1038a for indicating a review rate, a reply rate display field 1038b for indicating a reply rate to the review, and a relationship diagram display field 1038c for indicating a relationship between a reviewee who requests the review and a reviewer who receives the review request in the engineer team, as the activity situation of the engineer team for a predetermined period of time. The relationship diagram display field 1038c is a diagram illustrating a relationship between the reviewee who requests the review and who is requested to do the review and is doing the review, and displays, for example, a reviewee display field 1038d for displaying the reviewee who has made the pull request, a reviewer display field 1038e for displaying the reviewer who has received the review request, and a relationship display line 1038f for indicating a relationship between the reviewee display field 1038*d* and the reviewer display field 1038*e*. Also displayed is a period change input field 1038*g* for receiving a change of the predetermined period of time. Note that the horizontal lengths of the frames of the reviewee display field 1038*d* and the reviewer display field 1038*e* each indicate the number of reviews. Furthermore, the relationship diagram display field 1038*c* may be configured such that by selecting a specific reviewee display field 1038*d* and a reviewer display field 1038*e*, only the relationship display line 1038*f* related to the reviewee display field 1038*d* or the reviewer display field 1038*e* that has been selected is displayed.

With the review rate display field 1038*a* and the reply rate display field 1038*b*, it is possible to grasp at a glance the review conducted situation in the engineer team. In addition, with the relationship diagram display field 1038*c*, it is possible to grasp at a glance the relationship between the reviewee and the reviewer and a load situation of the review.

FIG. 16 is a diagram illustrating a display screen example of alert information to be displayed on the terminal device 10. The screen example of FIG. 16 illustrates a screen example in a state of displaying an alert that has been determined, based on a change in the team score for a certain period of time, and is displayed by scrolling or separately transitioning the screen from the screen example of FIG. 9, for example.

As illustrated in FIG. 16, the display 132 of the terminal device 10 displays an importance degree display field 1039*a* for indicating an importance degree of the alert information, an alert display field 1039*b* for displaying an alert that has been determined from the activity situation of the engineer team, an evidence link display field 1039*c* for displaying a link to information as evidence of the alert, and a date display field 1039*d* for displaying a date when the alert was determined.

In the importance degree display field 1039*a*, an illustration or symbol indicating the importance degree of the content of the alert to be displayed in the alert display field 1039*b* is displayed, for example, in red, in a case where the importance degree is higher. In the alert display field 1039*b*, an alert based on a change in the team score is displayed. However, an alert based on an element other than the change in the team score may be displayed (for example, a certain period of time or more has elapsed since the pull request was made, and the delivery date is approaching). With the display of such an alert display field 1039*b*, the user is able to grasp matters worth paying attention to in the activity situation of the engineer team.

Figure 17:
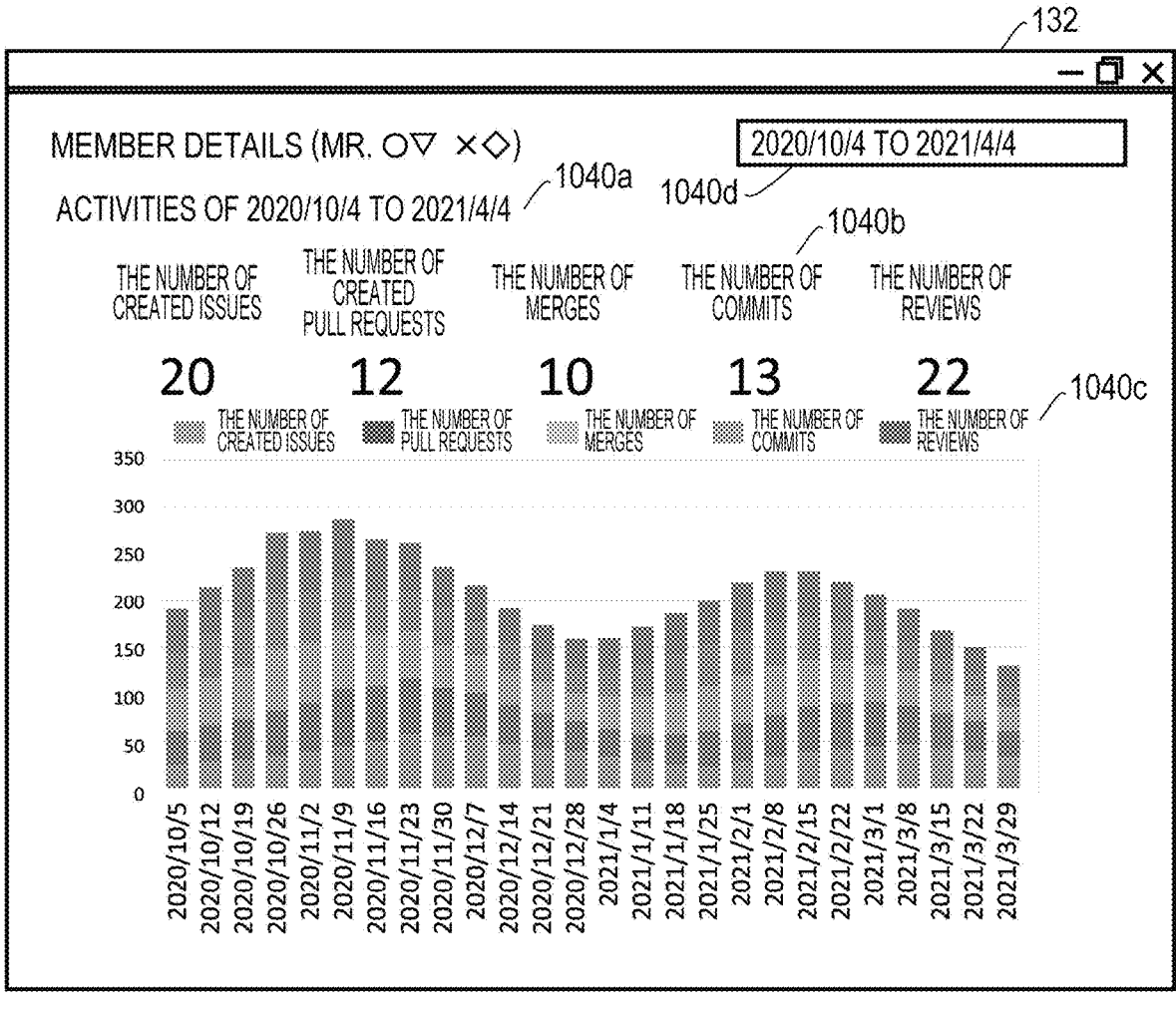
FIG. 17 is a diagram illustrating a display screen example of performance of a member to be displayed on the terminal device.

FIG. 17 is a diagram illustrating a display screen example of performance of a member to be displayed on the terminal device 10. The screen example of FIG. 17 illustrates a screen example in a state of displaying a value indicating the performance of a specific member who belongs to the engineer team and corresponding to a change in the team score for a certain period of time, and is displayed by scrolling or separately transitioning the screen from the screen example of FIG. 9, for example.

As illustrated in FIG. 17, the display 132 of the terminal device 10 displays a period display field 1040*a* for displaying a period of time while the performance of the member has been subjected to an arithmetic operation, a score display field 1040*b* for displaying details of personal scores indicating an activity situation (performance) of such a member, and a time-series change display field 1040*c* for indicating a total value of the personal scores of the member and changes of its details in a time-series manner. Also displayed is a period change input field 1040*d* for receiving a change of a period of time while the performance of such a member has been subjected to the arithmetic operation.

The period of time displayed in the period display field 1040*a* is a period of time indicated by a start date and an end date of the period of time while the personal scores displayed in the time-series change display field 1040*c* have been acquired, and the start date and the end date of six months are displayed as an example. Regarding the time-series changes displayed in the time-series change display field 1040*c*, weekly changes in the various parameters are displayed in stacked bar graphs. The horizontal axis represents time-series changes (for example, one element indicates one week) and the vertical axis represents values of the score. In the stacked bar graph in the time-series change display field 1040*c*, similarly to the parameters displayed in the score display field 1040*b*, weekly changes in the number of created issues, the number of pull requests, the number of merges, the number of commits, and the number of reviews are displayed, and changes in the total value are also displayed. Note that how much a cumulative value has changed from a certain time point may be displayed, instead of the total value. With the display of such a time-series change display field 1040*c*, the user is able to grasp the change in the activity situation of such a member, and to grasp the change to correspond to the change in the activity situation of the engineer team.

FIG. 18 is a diagram illustrating a display screen example of the pull request situation of a member to be displayed on the terminal device 10. The screen example of FIG. 18 illustrates a screen example of displaying the pull request situation of the source code by such a member, and is displayed by scrolling or separately transitioning the screen from the screen example of FIG. 17, for example.

As illustrated in FIG. 18, the display 132 of the terminal device 10 displays, as the pull request situation of the source code by such a member, for example, a list of source codes in each of which the pull request has been made for a certain period of time or more, that is, the review has been requested but the review has not been done (left untouched). Specifically, a source code display field 1041*a* for indicating the source code, an evidence link display field 1041*b* for displaying a link to information serving as evidence of the state of the source code, and a date display field 1041*c* for displaying the date when the pull request was made for the source code. Also displayed is a period change input field 1041*d* for receiving a change of the period of time while the performance of such a member has been subjected to an arithmetic operation.

In the source code display field 1041*a*, the source code in a state in which the pull request has been made for a certain period of time or more is displayed, and the evidence link display field 1041*b* is displayed as a means for confirming such a state. For example, when a certain period of time elapses since the pull request was made for the source code, this situation influences the lead time indicating the period from the start working on the source code to the delivery in the engineer team. Hence, in a case where the lead time is long, such a screen display is used for confirming the situation of the review on the screen. With such a source code display field 1041*a*, it becomes possible to grasp blank periods for the individual products.

Figure 19:
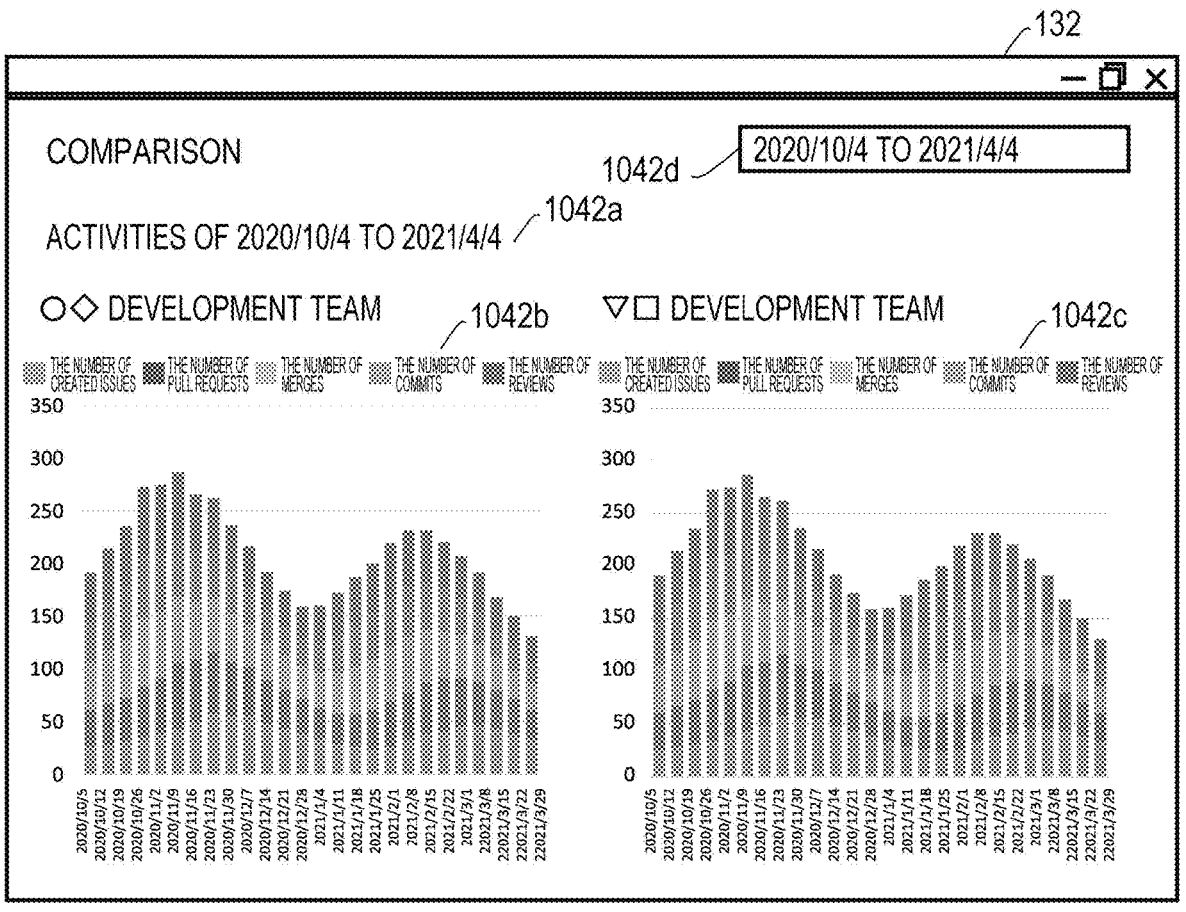
FIG. 19 is a diagram illustrating a display screen example in comparing between teams in the team activity situation to be displayed on the terminal device.

FIG. 19 is a diagram illustrating a display screen example in comparing between teams in the team activity situation to be displayed on the terminal device 10. The screen example of FIG. 19 illustrates a screen example in a state of displaying changes in the team score for a certain period of time and corresponding changes in the team score of another engineer team in a comparable manner, and is displayed by scrolling or separately transitioning the screen from the screen example of FIG. 9, for example.

As illustrated in FIG. 19, the display 132 of the terminal device 10 displays a period display field 1042*a* for displaying a period of time while the activity situation of such an engineer team is specified, a time-series change display field 1042*b* for indicating time-series changes in the total value of certain team scores and its details of the team score that is an activity situation of the engineer team, and a time-series change display field 1042*c* for indicating time-series changes in the total value and its details of the team score that is an activity situation of another engineer team to be a comparison target. Also displayed is a period change input field 1042*d* for receiving a change of the period of time while the activity situation of the engineer team is specified.

The period of time displayed in the period display field 1042*a* denotes a period of time indicated by a start date and an end date of the period of time while the team score displayed in the time-series change display field 1042*b* and the time-series change display field 1042*c* have been acquired, and the start date and the end date of six months are displayed as an example. Regarding the time-series changes displayed in the time-series change display field 1042*b* and the time-series change display field 1042*c*, weekly changes in the various parameters for the identical period of time are displayed in stacked bar graphs. The horizontal axis represents time-series changes (for example, one element indicates one week) and the vertical axis represents values of the score. In the stacked bar graphs of the time-series change display field 1042*b* and the time-series change display field 1042*c*, weekly changes in the number of created issues, the number of pull requests, the number of merges, the number of commits, and the number of reviews are displayed, and the changes in the total value are also displayed to correspond to the time-series change display field 1032*c* illustrated in FIG. 9. Note that in a case where the various parameters of the engineer team or another engineer team to be a comparison target are present only for a part of the period of time, such only a part of the period of time may be displayed, and the pieces of time-series information of both engineer teams are not necessarily the ones in the same timing. With the display of time-series change display field 1042*b* and the time-series change display field 1042*c* in this manner, the user is able to grasp the changes in the activity situation of the engineer team by comparing with those of another team. Note that items and graphs to be compared with another team are not limited to those illustrated in FIG. 19. Regarding any of the various team scores and graphs that have been described heretofore, it is possible to create similar team scores and graphs for another team for comparison.

Summary

As described heretofore, according to the present embodiment, the team score is specified by performing an arithmetic operation of the personal score of each member, based on the various parameters that are pieces of the log information of the products on GitHub, and the team score and various parameters are presented. Therefore, it becomes possible to appropriately grasp the activity situation (performance) as an engineer team. Accordingly, an opportunity to improve the management of the engineer team can be given, and necessary human resources can be supplied in accordance with the situation of the team organization.

In addition, an alert for the activity situation is determined, based on the activity situation of the engineer team and the changes in the activity situation of the engineer team, and is presented to the user. Therefore, it becomes possible to grasp matters worth paying attention to with regard to the activity situation of the engineer team to correspond to the activity situation as the engineer team. Accordingly, it becomes possible to contribute to identifying the cause of the change in the activity situation of the engineer team, and it becomes possible to consider a concrete plan for improving the management of the engineer team.

In addition, the performance of the member who belongs to the engineer team is obtained by performing an arithmetic operation, and is presented to the user together with the activity situation as the engineer team. Therefore, it becomes possible to grasp the activity situation as an engineer team to correspond to the performance of the member. Accordingly, it becomes possible to grasp that a specific member is a bottleneck and that a review between the specific member and another specific member is a bottleneck.

Furthermore, together with the activity situation as an engineer team, the activity situation is presented to the user in a comparable manner with the activity situation as another engineer team. Therefore, it becomes possible to grasp the activity situation as an engineer team by comparing with that of another team. Accordingly, it becomes possible to more objectively grasp the activity situation as an engineer team.

Second Embodiment

Hereinafter, another embodiment of the team activity evaluation system 1 will be described.

1 Overall Configuration of Team Activity Evaluation System 1

Figure 20:
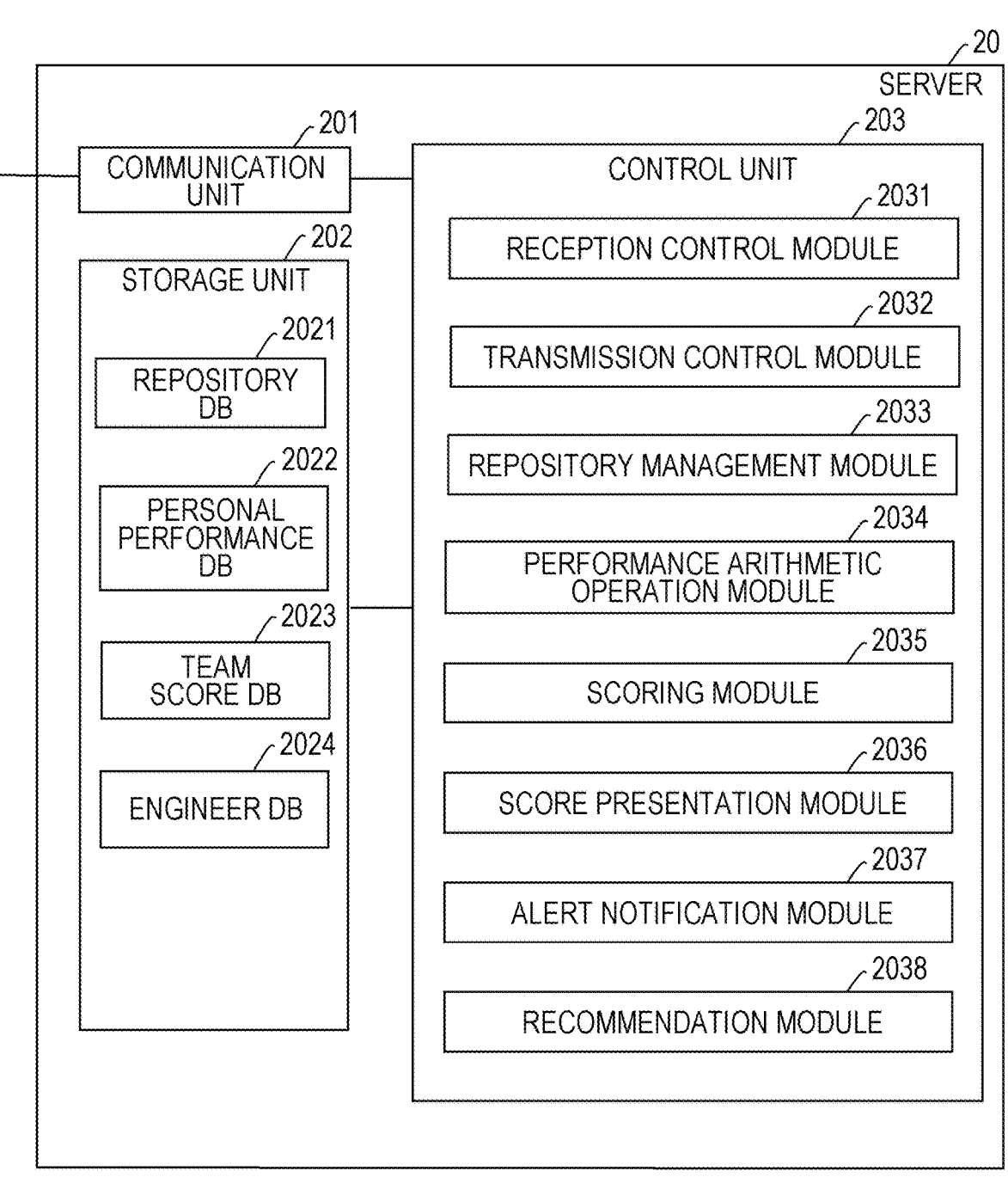
FIG. 20 is a diagram illustrating a functional configuration of a server, which constitutes a team activity evaluation system in a second embodiment.

FIG. 20 is a diagram illustrating a functional configuration of the server 20, which constitutes a team activity evaluation system 1 in a second embodiment. The overall configuration of the team activity evaluation system 1 and the configuration of a terminal device 10 in the second embodiment are similar to those in the first embodiment, and they will not be described again. As illustrated in FIG. 20, the configuration of the server 20 is similar to that in the first embodiment except that an engineer database 2024 is newly stored and functions of a recommendation module 2038 are provided. Hereinafter, the functions of the engineer database 2024 and the recommendation module 2038 in the second embodiment will be described.

The engineer database 2024 is a database for holding various types of information about other teams that have been acquired from a repository server 30 in the team activity evaluation system 1, for example, as information of an engineer who desires a transfer in accordance with consent of such an engineer. In addition, the engineer database 2024 may also hold information of an engineer, who is registered in a so-called job change platform, and who desires to change jobs in accordance with consent of such an engineer. Details will be described later. Note that the engineer database 2024 is not an essential configuration for implementing the function of the recommendation module 2038, and may be configured to recommend information about an engineer who has received coordination from another system or the like, by use of the recommendation module 2038.

The recommendation module 2038 controls processing of extracting and presenting (recommending), regarding an engineer team user whose activity situation has been presented by the presentation module 2037, either one of a cause of a change in an activity situation of the engineer team or an improvement suggestion or both of them to the user. In this situation, the recommendation module 2038 analyzes the various parameters stored in the team score database 2023, outputs an analysis result, and presents the cause of the change or the improvement suggestion, based on the analysis result. For example, regarding either one of information that has been uploaded online to create a product as an engineer (the number of created codes, the number of pushes, and the like) or information that has been reviewed by a member of the engineer team for the product (the number of reviews, the number of comments, and the like) or both of them, a reduced parameter, a task, an action, and a member that can be a cause may be presented, and a change of the member in charge, an assignment of a new member, and the like may be presented and recommended to the user.

For example, in a case where a personal score indicating an achievement of a certain member is sluggish (fluctuated) and also influences an activity situation of an engineer team, a conceivable cause is that a product (source code or the like) that the certain member is in charge does not match the skills of the certain member, the certain member is not good at it, or the like. For this reason, the recommendation module 2038 may present, to the user, a change of the product (source code or the like) that the certain member is in charge. In addition, in a case where the personal scores indicating the review information of certain members are sluggish and also influences the activity situation of the engineer team, a conceivable cause is that the certain members do not get along with each other, some difficulty in communication is occurring, or the like. For this reason, the recommendation module 2038 may present, to the user, a change of a review relationship (reviewer and reviewee) between the certain members.

Furthermore, in a case where the number of pushes and the number of pull requests of the source code are not sluggish, but the number of reviews and the number of comments are sluggish, it is conceivable that the number of members who conduct the review is insufficient. For this reason, the recommendation module 2038 may present, to the user, participation of another member who is an engineer but does not belong to the engineer team. In this situation, the recommendation module 2038 conducts matching with information (values) indicating achievements of an engineer that are stored in the engineer database 2024, determines whether the engineer is adaptable, and recommends the engineer to the user upon determination that the engineer is adaptable to the engineer team. As an example of determining whether an engineer is adaptable to an engineer team, it becomes possible by selecting a predetermined decision criterion from the team performance activity situation and extracting an engineer who satisfies the selected decision criterion from among engineers of other teams registered in the engineer database 2024 or engineers registered in the job change platform. Specifically, in a case where the fact that the review is regularly sluggish is detected from the lead time of the pull request or the like as the engineer activity situation, a decision criterion for the review (for example, the number of reviews within a predetermined period of time is equal to or larger than a predetermined threshold value, or the like) is selected, and an engineer who satisfies the decision criterion is extracted and then recommended. As another example, in a case where the fact that the number of entire pull requests in a team has decreased is detected, a decision criterion for the pull request (for example, the number of pull requests within a predetermined period of time is equal to or larger than a predetermined threshold value, or the like) is selected, and an engineer who satisfies the decision criterion is extracted and then recommended.

2 Data Structure

FIG. 21 is a diagram illustrating a data structure of the engineer database 2024, which is stored in the server 20.

As illustrated in FIG. 21, each record in the engineer database 2024 includes an item "engineer ID", an item "self-reported skill", an item "score information", an item "performance details", and the like. Note that the item "self-reported skill" and the item "score information" are similar to the items having the alliance names in the personal performance database 2022 illustrated in FIG. 5. Hence, the descriptions will be omitted.

The item "engineer ID" denotes information for identifying each engineer to be recommended by the team activity evaluation system 1.

The item "performance details" denotes information about an action that has been acquired from various parameters of log information on GitHub and that is an action of a member, who belongs to the engineer team and who receives a presentation of the activity situation of the engineer team from the team activity evaluation system 1, and specifically includes an item "team ID (belonging to)", an item "action", an item "partner member ID", an item "value", and the like. Note that the item "action", the item "partner member ID", and the item "value" are similar to the items having the alliance names in the personal performance database 2022 illustrated in FIG. 5. Hence, the descriptions will be omitted.

The item "team ID (belonging)" denotes information for identifying each engineer team.

In a case where the participation of another member is presented to the user and then recommended, the recommendation module 2038 conducts matching with reference to the item "performance details" in the engineer database 2024, and recommends an appropriate engineer to the user.

3 Operation

The operation in the second embodiment is similar to that in the first embodiment, and it will not be described again.

4 Screen Example

Hereinafter, referring to FIG. 22, a screen example of recommendation processing of an engineer by the team activity evaluation system 1 will be described.

Figure 22:
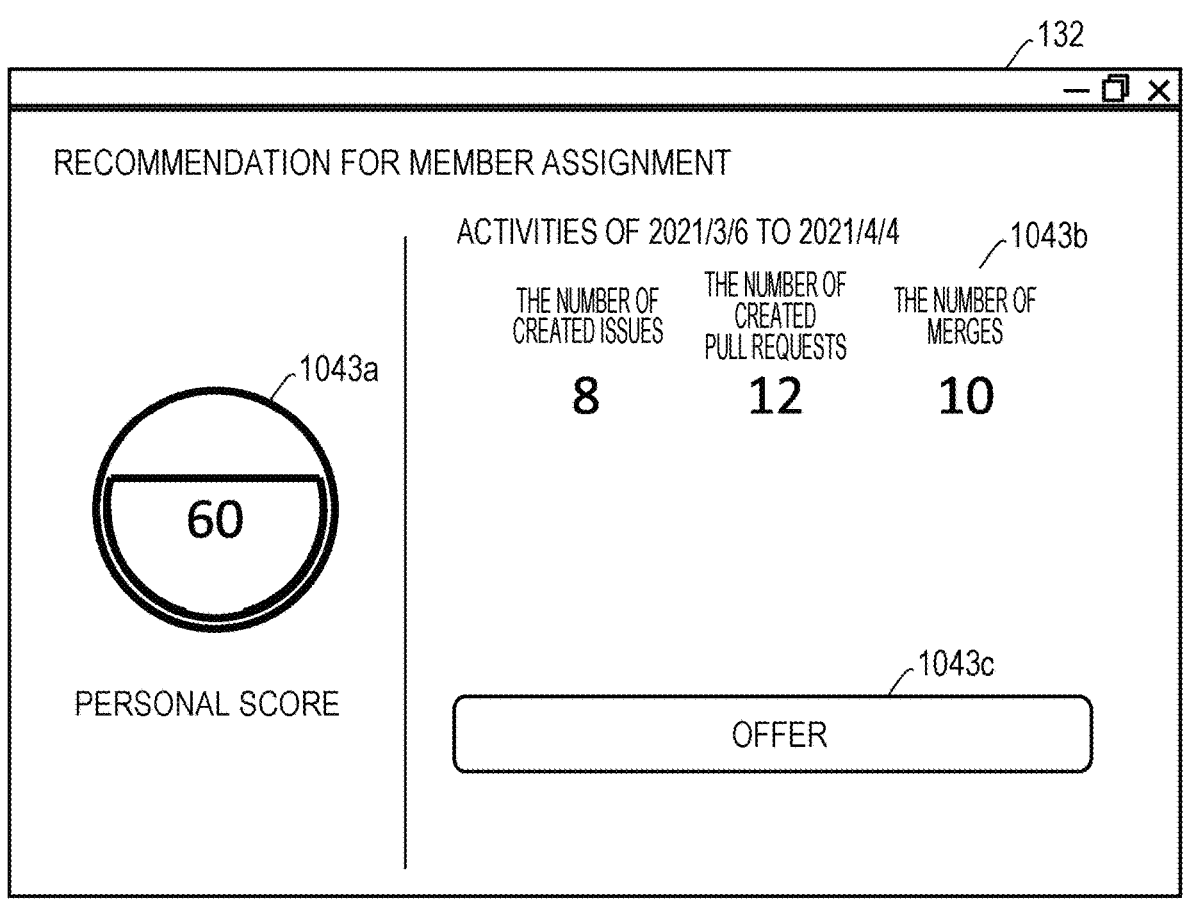
FIG. 22 is a diagram illustrating a display screen example of a recommendation display of an engineer to be displayed on the terminal device.

FIG. 22 is a diagram illustrating a display screen example of a recommendation display of an engineer to be displayed on the terminal device 10. The screen example of FIG. 22 illustrates a screen example in a state of displaying the personal score of the engineer to be recommended and the performance information of the engineer.

As illustrated in FIG. 22, in response to an instruction operation for displaying the activity situation of the engineer team, the display 132 of the terminal device 10 displays a personal score display field 1043a, a score display field 1043b for displaying details of personal score indicating the performance of the engineer, and an offer button 1043c to be pressed when making an offer to the engineer, so as to be illustrated in FIG. 22. The user refers to the score displayed in the score display field 1043*b* of the engineer, and determines whether to make an assignment of the engineer. Upon determination of the assignment, the user presses the offer button 1043*c*, and a notification is given to the engineer. With such a configuration, it becomes possible to assign an appropriate engineer.

SUMMARY

As described heretofore, according to the present embodiment, the improvement suggestion is recommended with regard to the various parameters of the activity situation of the engineer team. For example, a recommendation is made for a specific member, and an assignment of a new member is recommended. Accordingly, it becomes possible to grasp the improvement suggestion for the activity situation of the engineer team.

Heretofore, the embodiments according to the disclosure have been described. However, they can be implemented in various other aspects, and can be implemented with various omissions, substitutions, and changes. These embodiments, modifications, and omissions, substitutions, and changes are included in the technical scope of the claims and the scope of equivalents thereof.

Supplementary Note

The matters that have been described in the above embodiments will be supplementally described below.

(Supplementary note 1) A program to be executed by a computer including a processor 29 and a storage unit 202, in which the program causes the processor to execute: a step of specifying a parameter indicating an activity situation of an engineer team, based on histories of information that a member who belongs to the engineer team has uploaded online to create a product, as an engineer, and information of a review that the member of the engineer team has conducted on the product that has been uploaded (S114); and a step of presenting the parameter to a user (S224).

(Supplementary note 2) The program described in (Supplementary note 1), in which in the step of specifying the parameter, the information that the member has uploaded the product online and the information of the review that the member of the engineer team has conducted on the product are acquired from a source code hosting service that manages a source code that is the product of the engineer team.

(Supplementary note 3) The program described in (Supplementary note 1) or (Supplementary note 2), in which in the step of specifying the parameter, the parameter is specified, based on a value indicating an achievement that has been done by each member of the engineer team.

(Supplementary note 4) The program described in (Supplementary note 3), in which the parameter is specified by accumulating values each indicating the achievement that each member of the engineer team has done during a predetermined period of time that has been designated by the user.

(Supplementary note 5) The program described in one of (Supplementary note 1) to (Supplementary note 4), in which one or a plurality of the number of uploads, the number of created codes, the number of corrected codes, the number of review requests, and the number of integrations for confirming a review result on a management means that manages the product of a project in the engineer team are acquired as the information that the member has uploaded the product online.

(Supplementary note 6) The program described in (Supplementary note 5), in which in the step of presenting the parameter, one or the plurality of the number of uploads, the number of created codes, the number of corrected codes, the number of review requests, and the number of integrations are presented as time-series information to the user.

(Supplementary note 7) The program described in (Supplementary note 5) or (Supplementary note 6), in which weighting is given, based on either a difficulty degree or an importance degree of a created code and a corrected code respectively corresponding to the number of created codes and the number of corrected codes, and the parameter is specified, or after a predetermined period of time lapses since creation, the parameter is specified, based on the histories including the number of remaining codes.

(Supplementary note 8) The program described in one of (Supplementary note 1) to (Supplementary note 7), in which one or a plurality of the number of reviews, the number of comments, and the number of comment replies on the management means are acquired as the information of the review that the member of the engineer team has conducted on the product.

(Supplementary note 9) The program described in (Supplementary note 8), in which one or a plurality of the number of reviews, the number of comments, and the number of comment replies are presented as time-series information to the user.

(Supplementary note 10) The program described in one of (Supplementary note 1) to (Supplementary note 9), in which the program causes the processor to further acquires, as a parameter, a lead time indicating a period of time from a request for the review to a close in the engineer team, and present the lead time to the user.

(Supplementary note 11) The program described in one of (Supplementary note 1) to (Supplementary note 10), in which the program causes the processor to further acquire, as an activity situation of the engineer team, details indicating a transition of the product for which a request for the review has been made in the engineer team, and present the details to the user.

(Supplementary note 12) The program described in one of (Supplementary note 1) to (Supplementary note 11), in which the program causes the processor to further acquire, as an activity situation of the engineer team, a relationship between the number of comments on the product for which a request for the review has been made in the engineer team and a lead time indicating a period of time from the request for the review to a close in the engineer team, and present the relationship to the user.

(Supplementary note 13) The program described in one of (Supplementary note 1) to (Supplementary note 12), in which the program causes the processor to further acquire, as an activity situation of the engineer team, a relationship between a reviewee who makes a request for the review and a reviewer who receives the request for the review in the engineer team, and present the relationship to the user.

(Supplementary note 14) The program described in one of (Supplementary note 1) to (Supplementary note 13), in which the program causes the processor to further execute: a step of performing an arithmetic operation of a value indicating an achievement of the member who belongs to the engineer team; and presenting the value indicating the achievement of the member who belongs to a specific engineer team.

(Supplementary note 15) The program described in (Supplementary note 14), in which one or a plurality of the number of uploads, the number of created codes, the number of corrected codes, the number of review requests, and the number of integrations for confirming a review result for a management means that manages the products of a project in the engineer team are subjected to an arithmetic operation to acquire as the value indicating the achievement of the member who belongs to the engineer team.

(Supplementary note 16) The program described in one of (Supplementary note 1) to (Supplementary note 15), in which the program causes the processor to further execute a step of giving a notification of an alert, based on a change in the parameter for a predetermined period of time.

(Supplementary note 17) The program described in (Supplementary note 16), in which a value of the parameter for the predetermined period of time is detected to be an outlier based on a value of the parameter for another period of time, and a notification of an alert is given, based on the outlier that has been detected or based on a change in a value indicating an achievement of a member who belongs to a specific engineer team.

(Supplementary note 18) The program described in (Supplementary note 17), in which a change in one or a plurality of the number of uploads, the number of comments, a period of time until the review starts, the numbers of reviews by the member and another member, a review period of time, and the number of comments of a project in the engineer team is detected as the value indicating the achievement of the member who belongs to the specific engineer team, and the notification of an alert based on the change is given.

(Supplementary note 19) The program described in one of (Supplementary note 16) to (Supplementary note 18), one or both of a cause of the change in the activity situation of the engineer team and an improvement suggestion are extracted, based on the change in the parameter for the predetermined period of time, and are presented.

(Supplementary note 20) The program described in (Supplementary note 19), in which from the histories of the engineer team, one or both of information in which the product that is reduced for the predetermined period of time and that has been uploaded online and the information of the review that has been conducted by the member of the engineer team are presented as the cause of the change in the parameter.

(Supplementary note 21) The program described in (Supplementary note 19) or (Supplementary note 20), in which the histories of the engineer team are analyzed, and one or a plurality of a task, an action, and the member who belongs to the engineer team to be the cause of the change in the parameter for the predetermined period of time are detected and presented.

(Supplementary note 22) The program described in one of (Supplementary note 19) to (Supplementary note 21), in which the program causes the processor to further execute: a step of acquiring a value indicating an achievement of an engineer who is outside the engineer team; a step of matching the value indicating the achievement of the engineer who is outside the engineer team with the histories of the engineer team, and determining whether the engineer who is outside the engineer team is adaptable to the engineer team; and a step of presenting participation of the engineer who is outside the engineer team in the engineer team as the improvement suggestion, in a case of determining that the engineer who is outside the engineer team is adaptable to the engineer team.

(Supplementary note 23) The program described in one of (Supplementary note 1) to (Supplementary note 22), in which the program causes the processor to further execute a step of associating the parameter with time-series information, and presenting a parameter indicating an activity situation of another engineer team in association with time-series information in a comparable manner.

(Supplementary note 24) The program described in (Supplementary note 23), in which the parameter is presented in the comparable manner with another engineer team with the lead time as a reference.

(Supplementary note 25) An information processing apparatus including a control unit and a storage unit, in which the control unit executes: a step of specifying a parameter indicating an activity situation of an engineer team, based on histories of information that a member who belongs to the engineer team has uploaded online to create a product, as an engineer, and information of a review that the member of the engineer team has conducted on the product that has been uploaded; and a step of presenting the parameter to a user.

(Supplementary note 26) A method to be executed by a computer including a processor and a storage unit, in which in the method, the processor executes: a step of specifying a parameter indicating an activity situation of an engineer team, based on histories of information that a member who belongs to the engineer team has uploaded online to create a product, as an engineer, and information of a review that the member of the engineer team has conducted on the product that has been uploaded; and a step of presenting the parameter to a user.

The invention claimed is:

1. An apparatus, comprising:

processing circuitry configured to specify a parameter indicating an activity situation of an engineer team, based on (i) histories of information that a member who belongs to the engineer team has uploaded online during development of software products, and (ii) information of reviews that members of the engineer team have conducted on the uploaded software products;

present the parameter to a user, wherein one or a plurality of the number of reviews, the number of comments, and the number of comment replies are acquired as the information of the review that the member of the engineer team has conducted on the product, wherein one or a plurality of the number of reviews, the number of comments, and the number of comment replies are presented as time-series information to the user, and acquire, as a parameter, a lead time indicating a period of time from a request for the review to a close in the engineer team, and present the lead time to the user.

2. The apparatus according to claim 1, wherein the processing circuitry is further configured to acquire, from each repository that is set for each engineer team, information that a member who belongs to the engineer team has uploaded online to create a product, and information of a review that the member of the engineer team has conducted on the product that has been uploaded.

3. The apparatus according to claim 1, where the circuitry for specifying the parameter is further configured to acquire, from a source code hosting service that manages a source code that is the product of the engineer team, the information that the member has uploaded the product online and the information of the review that the member of the engineer team has conducted on the product.

4. The apparatus according to claim 1, wherein in the step of specifying the parameter, the parameter is specified, based on a value indicating an achievement that has been done by each member of the engineer team.

5. The apparatus according to claim 3, wherein one or a plurality of the number of uploads, the number of created codes, the number of corrected codes, the number of review requests, and the number of integrations for confirming a review result on a product of a project in the engineer team are acquired as the information that the member has uploaded the product online.

6. The apparatus according to claim 5, wherein the circuitry for presenting the parameter is further configured to
    present, as time-series information, one or the plurality of the number of uploads, the number of created codes, the number of corrected codes, the number of review requests, and the number of integrations to the user.

7. The apparatus according to claim 1, wherein the processing circuitry is further configured to acquire, as an activity of the engineer team, details indicating a transition of the product for which a request for the review has been made in the engineer team, and present the details to the user.

8. The apparatus according to claim 7, wherein the processing circuitry is further configured to
    acquire, as an activity of the engineer team, a relationship between the number of comments on the product for which a request for the review has been made in the engineer team and a lead time indicating a period of time from the request for the review to a close in the engineer team, and present the relationship to the user.

9. The apparatus according to claim 8, wherein the processing circuitry is further configured to
    acquire, as an activity of the engineer team, a relationship between a reviewee who makes a request for the review and a reviewer who receives the request for the review in the engineer team, and present the relationship to the user.

10. The apparatus according to claim 9, wherein the processing circuitry is further configured to
    perform an arithmetic operation of a value indicating an achievement of the member who belongs to the engineer team; and
    present the value indicating the achievement of the member who belongs to specific the engineer team.

11. The apparatus according to claim 10, wherein one or a plurality of the number of uploads, the number of created codes, the number of corrected codes, the number of review requests, and the number of integrations for confirming a review result of a project in the engineer team are subjected to an arithmetic operation to acquire as the value indicating the achievement of the member who belongs to the engineer team.

12. The apparatus according to claim 11, wherein the processing circuitry is further configured to
    give a notification of an alert, based on a change in the parameter for a predetermined period of time.

13. The apparatus according to claim 12, wherein a change in one or a plurality of the number of uploads, the number of comments, a period of time until the review starts, the numbers of reviews by the member and another member, a review period of time, and the number of comments of a project in the engineer team is detected as the value indicating the achievement of the member who belongs to the specific engineer team, and the notification of an alert based on the change is given.

14. The apparatus according to claim 13, the processing circuitry is further configured to
    extract one or both of a cause of the change in the activity situation of the engineer team and an improvement suggestion based on the change in the parameter for the predetermined period of time, and present one or both of the cause of the change in the activity situation and the improvement suggestion.

15. The apparatus according to claim 1, wherein the processing circuitry is further configured to associate the parameter with time-series information, and present a parameter indicating an activity situation of another engineer team in association with time-series information in a comparable manner.

16. The apparatus according to claim 15, wherein the parameter is presented in the comparable manner with another engineer team with the lead time as a reference.

17. A non-transitory computer-readable storage medium storing computer-readable instructions thereon which, when executed by a computer, cause the computer to perform a method, the method comprising:
    specifying a parameter indicating an activity situation of an engineer team, based on (i) histories of information that a member who belongs to the engineer team has uploaded online during development of software products, and (ii) information of reviews that members of the engineer team have conducted on the uploaded software products;
    presenting the parameter to a user,
    wherein one or a plurality of the number of reviews, the number of comments, and the number of comment replies are acquired as the information of the review that the member of the engineer team has conducted on the product,
    wherein one or a plurality of the number of reviews, the number of comments, and the number of comment replies are presented as time-series information to the user, and
    acquiring, as a parameter, a lead time indicating a period of time from a request for the review to a close in the engineer team, and presenting the lead time to the user.

18. An apparatus, comprising:
    processing circuitry configured to
    specify a parameter indicating an activity situation of an engineer team, based on (i) histories of information that a member who belongs to the engineer team has uploaded online during development of software products, and (ii) information of reviews that members of the engineer team have conducted on the uploaded software products;
    present the parameter to a user,
    wherein one or a plurality of the number of reviews, the number of comments, and the number of comment replies are acquired as the information of the review that the member of the engineer team has conducted on the product,
    wherein one or a plurality of the number of reviews, the number of comments, and the number of comment replies are presented as time-series information to the user, and
    associate the parameter with time-series information, and present a parameter indicating an activity situation of another engineer team in association with time-series information in a comparable manner.

* * * * *